United States Patent [19]
Komiya et al.

[11] Patent Number: 5,768,671
[45] Date of Patent: Jun. 16, 1998

[54] COLOR IMAGE FORMING APPARATUS HAVING MISREGISTRATION CORRECTION

[75] Inventors: Kenichi Komiya; Koji Tanimoto; Naoaki Ide, all of Kanagawa-ken, Japan

[73] Assignee: Kabushiki Kaisha Toshiba, Kawasaki, Japan

[21] Appl. No.: 528,497

[22] Filed: Sep. 14, 1995

[30] Foreign Application Priority Data

Sep. 29, 1994 [JP] Japan .................. 6-235694

[51] Int. Cl.⁶ .................................. G03G 15/01
[52] U.S. Cl. .................................. 399/301
[58] Field of Search .................. 355/208, 212, 355/271, 272, 326 R, 327; 399/49, 72, 299, 300, 301, 395, 24, 26

[56] References Cited

U.S. PATENT DOCUMENTS

| | | | |
|---|---|---|---|
| 4,916,547 | 4/1990 | Katsumata et al. | 358/300 |
| 4,972,088 | 11/1990 | Weyer et al. | 250/548 |
| 5,325,154 | 6/1994 | Tayama et al. | 355/208 |
| 5,418,556 | 5/1995 | Andrews | 347/116 |
| 5,424,809 | 6/1995 | Sawayama et al. | 355/208 |
| 5,452,073 | 9/1995 | Kataoka | 355/271 |
| 5,510,877 | 4/1996 | DeJong et al. | 355/208 |
| 5,550,625 | 8/1996 | Takamatsu et al. | 355/326 R |

FOREIGN PATENT DOCUMENTS 59-160156  9/1984  Japan .

*Primary Examiner*—Robert Beatty
*Attorney, Agent, or Firm*—Foley & Lardner

[57] ABSTRACT

An image forming apparatus includes plural latent image forming units for forming latent images on plural image carriers, plural developing units for developing the latent image formed on the image carriers and plural transfer units for transferring the color images developed on the image carriers to an image receiving medium conveyed by a medium support member. This image forming apparatus also includes a first detector for detecting a test pattern. This first detector has a light projecting portion and a light receiving portion which is arranged in parallel with the running direction of the medium support member. The image forming apparatus has a computing unit which computes misregistration of color images developed and transferred onto one of the medium support member and the image receiving medium based on a difference between a detection result by the detector and a threshold value. The misregistration of color images are corrected based on the results of computation by the computing unit. This first detector may be positioned opposite a vibration control roller. Additionally, a second detector detects a variation of a quantity of light reflected from the medium support member and the threshold value is changed accordingly, or the test pattern is prevented from being formed on a contaminated section of the support member.

11 Claims, 24 Drawing Sheets

Fig.14A

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| 1 | 0 | 0 | 0 | 0 | 0 | 0 | 0 | 0 | 0 | 0  | 0  | 0  | 0  | 0  | 0  | 0  |
| 2 | F | F | F | F | F | F | F | F | F | F  | F  | F  | F  | F  | F  | F  |
| 3 | 0 | 0 | 0 | 0 | 0 | 0 | 0 | 0 | 0 | 0  | 0  | 0  | 0  | 0  | 0  | 0  |

Fig.14B

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| 1 | 0 | 0 | 0 | 0 | 0 | 0 | 0 | 0 | 0 | F  | F  | F  | F  | F  | F  | F  |
| 2 | F | F | F | F | F | F | F | F | F | 0  | 0  | 0  | 0  | 0  | 0  | 0  |
| 3 | 0 | 0 | 0 | 0 | 0 | 0 | 0 | 0 | 0 | 0  | 0  | 0  | 0  | 0  | 0  | 0  |

Fig.14C

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| 1 | 0 | 0 | 0 | 0 | 0 | 0 | 0 | 0 | 0 | 0  | 0  | 0  | 0  | 0  | 0  | 0  |
| 2 | F | E,l | D,l | C,l | B,l | A,l | 9,l | 8,l | 7,l | 6,l | 5,l | 4,l | 3,l | 2,l | 1,l | 0 |
| 3 | 0 | 1,u | 2,u | 3,u | 4,u | 5,u | 6,u | 7,u | 8,u | 9,u | A,u | B,u | C,u | D,u | E,u | F |

|   | 1 | 2 | 3 | 4 | 5 | 6 | 7 | ... | n-6 | n-5 | n-4 | n-3 | n-2 | n-1 | n |
|---|---|---|---|---|---|---|---|---|---|---|---|---|---|---|---|
|   | 0 | 0 | 0 | 0 | 0 | 0 | 0 |   | 0 | 0 | 0 | 0 | 0 | 0 | 0 |
|   | F | F | F | F | F | F | F |   | F | F | F | F | F | F | F |
|   | 0 | 0 | 0 | 0 | 0 | 0 | 0 |   | 0 | 0 | 0 | 0 | 0 | 0 | 0 |

|   | 1 | 2 | 3 | 4 | 5 | 6 | 7 | ... | n-6 | n-5 | n-4 | n-3 | n-2 | n-1 | n |
|---|---|---|---|---|---|---|---|---|---|---|---|---|---|---|---|
|   | 0 | 0 | 0 | 0 | 0 | 0 | 0 |   | 0 | 0 | 0 | 0 | 0 | 0 | 0 |
|   | F | F | F | E,l | E,l | E,l | D,l |   | 2,l | 1,l | 1,l | 1,l | 0 | 0 | 0 |
|   | 0 | 0 | 0 | 1,u | 1,u | 1,u | 2,u |   | D,u | E,u | E,u | E,u | F | F | F |

COLOR IMAGE FORMING APPARATUS HAVING MISREGISTRATION CORRECTION

BACKGROUND OF THE INVENTION

1. Field of the Invention

The present invention relates to a transfer type image forming apparatus which is used in a color laser printer or a digital color copying machine.

2. Description of the Related Art

A conventional transfer type image forming apparatus comprises plural photosensitive drums on which latent images are formed for every image data which are decomposed into color components, plural developing means for forming images on respective photosensitive drums corresponding to respective color components by developing latent images formed on the photosensitive drums, plural transfer units for transferring the images developed by the developing means on recording paper in order, and fixing units for fixing the images transferred on recording paper.

As this type of image forming apparatus, a system with plural image forming portions arranged in series along a paper conveying portion (a transfer belt), which transfers images formed in respective color components by plural image forming portions on recording paper conveyed by a transfer belt in order has been widely known.

When a transfer belt as a medium support member is cleaned by a transfer belt cleaner to remove paper powder and dust adhered thereon, scores are produced on the transfer belt in parallel with its running direction.

As these scores produced on the transfer belt cause diffusion and deflection of the light from the light emitting portion, sensors which detect detecting objects such as toners, etc. on the transfer belt using the reflecting light are adversely affected when detecting the transfer belt 22 and a test pattern (toner).

That is, the sensors detect the test pattern position from a difference between the intensity of the reflected light from the test pattern and that of the reflected light from the transfer belt. Normally, a threshold for binarizing the sensor output is based on the sensor output of a test pattern portion and is preset when shipped from the factory.

However, if the reflectance of the transfer belt drops, a margin between the sensor outputs of the transfer belt and the test pattern becomes small, thus there was such a problem that no binary output is obtained in the worst case.

Further, the transfer belt runs while oscillating upward and downward. A registration sensor arranged on the transfer belt is provided with a light emitting portion and a light receiving portion.

As the light emitting portion and the light receiving portion of the registration sensor have been set in the direction so that the light projecting angle becomes equal to the light receiving angle, if the position of the transfer belt is changed by the vibration thereof, a ratio of the reflected light component that is reflecting on the surface of the transfer belt and arriving at the light receiving portion decreases. That is, there was such a problem that a stabilized output cannot be obtained from the registration sensor because the standard reflecting factor of the light on the surface of the transfer belt and that when detecting a test pattern will change according to the position of the transfer belt.

Furthermore, because of paper jamming and other causes, scores may be produced on the transfer belt. These scores have no regularity in direction, size, etc. differing from those produced when the transfer belt is cleaned by a transfer belt cleaner to remove paper powder, dust, etc. If such scores are produced, as the reflecting factor on the surface of the transfer belt changes, the output of the registration sensor changes and there was such a problem that these scores were erroneously detected as a test pattern or it became difficult to detect a test pattern at the points of scores.

Further, if scores on the surface of the transfer belt increased, the surface of the transfer belt was deteriorated, the reflectance dropped and there became no difference with the reflectance of a test pattern (toner), and it becomes impossible to detect a test pattern. There was such a problem that at this point of time, the registration sensor does no longer function and it becomes not feasible to make the correction of misregistration of color images that is performed based on the output from the registration sensor.

SUMMARY OF THE INVENTION

It is an object of the present invention to provide an image forming apparatus which is capable of preventing an accurate test pattern detection from becoming impossible due to change in the sensor outputs resulting from the state change on the transfer belt.

The present invention provides an image forming apparatus comprising first image forming means for forming a first image on a first image carrier, second image forming means for forming a second image on a second image carrier, means for transferring the first image and the second image onto an image receiving medium conveyed by a medium support member to overlap the first and second images on each other on the image receiving medium, pattern forming means for forming a test pattern on one of the medium support member and the image receiving medium by the first and second image forming means, means for detecting the test pattern from a difference between a reflectance of light from the test pattern and a reflectance of light from the medium support member using a threshold value, means for correcting a misregistration relative to correct positions of the first and second images formed by the first and second image forming means based on a position of the test pattern detected by the detecting means, means for measuring a reflectance of the medium support member from an output of the detecting means, and means for changing the threshold value in accordance with the reflectance measured by the measuring means so that the changed threshold value makes the detecting means easily to detect the test pattern irrespective of decreasing of the reflectance.

BRIEF DESCRIPTION OF THE DRAWINGS

FIGS. 14A through 14C are outline diagrams showing a method for correcting the degree of parallelism of the imaging bars;

DETAILED DESCRIPTION OF THE PREFERRED EMBODIMENTS

Hereinafter, the embodiments of the present invention will be explained referring to the attached drawings.

Figure 1:
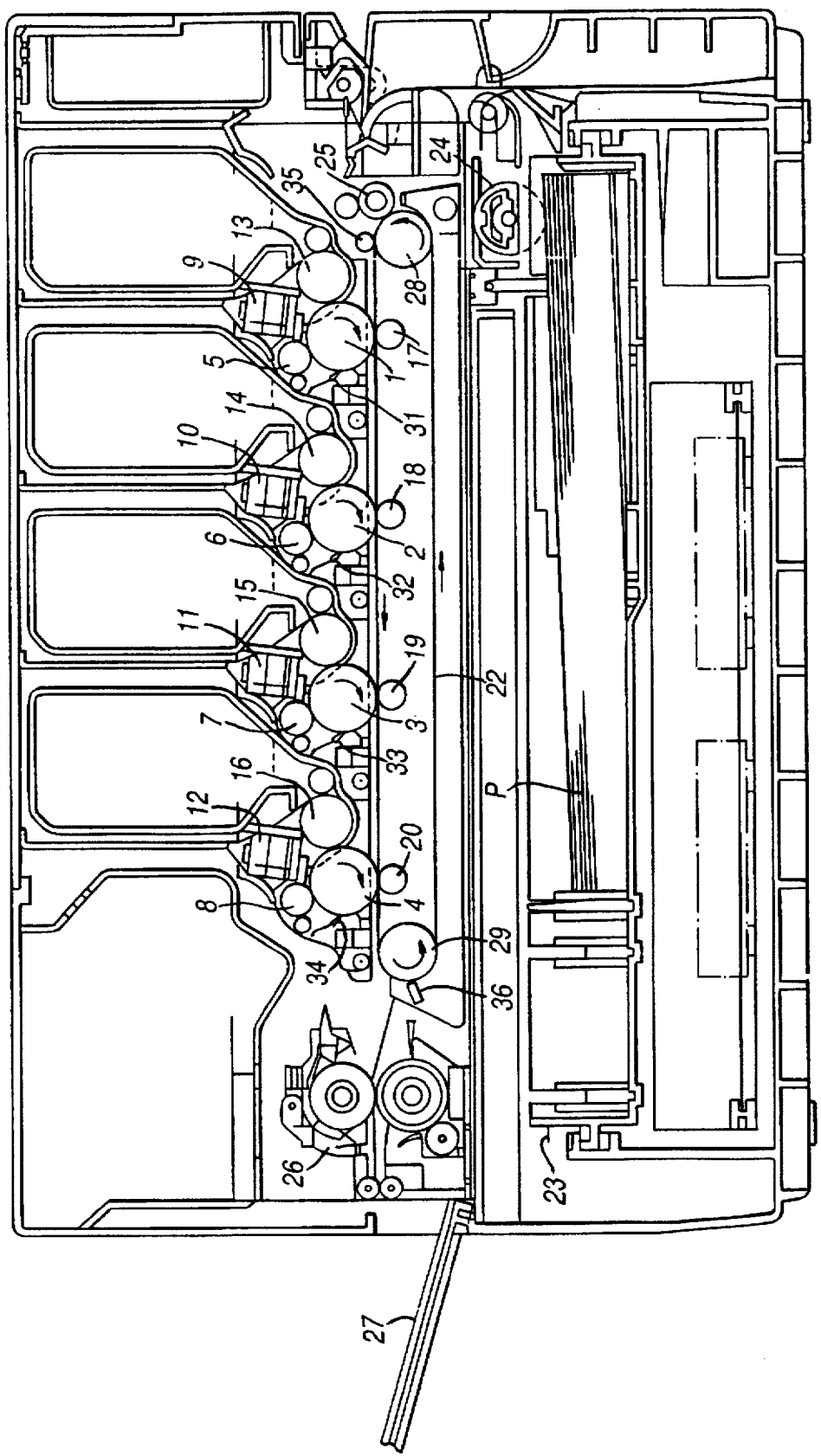
FIG. 1 is a sectional view showing a transfer type color image forming apparatus as the image forming apparatus of the present invention.

First, the structure of a transfer type color image forming apparatus with the present invention applied will be explained referring to FIG. 1. In FIG. 1 the transfer type color image forming apparatus includes photosensitive drums 1–4 as image carriers formed in the rotatable state in the arrow direction and plural image forming portions to form an image for each of respective resolved color components. These image forming portions (that is, the photosensitive drums 1–4) have been arranged in series along the running direction of the transfer belt 22 as a transfer material carrier. The transfer belt 22 is of endless type and is put over a pair of separated supporting rollers 28 and 29.

Around the photosensitive drum 1, a charging roller 5 which is a charging means, a first imaging bar 9 as a latent image forming means, a developing unit 13 as a developing means, a transfer roller 17 as a transfer means and a cleaner 31 have been arranged in order along the rotating direction of the photosensitive drum 1. For second to fourth image forming units, that is, the photosensitive drums 2–4, charging rollers 6–8, second to fourth imaging bars 10–12, developing units 14–16, transfer rollers 18–20 and cleaners 32–34 have been arranged. Hereinafter, the first photosensitive drum 1 will be explained as a representative photosensitive drum and the detailed explanation on the second to fourth photosensitive drums 2–4 will be omitted.

The photosensitive drum 1 is rotated in the arrow direction and its surface is uniformly charged by the charging roller 5. Image data (Y=Yellow) is exposed by the first imaging bar 9 and a static latent image corresponding to an image data (Y) is formed on the surface of the photosensitive drum 1. This latent image (Y) is developed by the developing unit 13. Thereafter, static latent images corresponding to image data (M=Magenta), (C=Cyan) and (Bk=Black) formed on the second to fourth photosensitive drums 2–4 are developed in order.

On the other hand, paper P as an image receiving medium is sent out from a paper supply cassette 23 by a paper supply roller 24 and after properly positioned by an aligning roller 25, it is supplied toward the transfer belt 22 and adsorbed statically and held thereon. The transfer paper P is conveyed in the arrow direction while being held on the transfer belt 22 pursuant to the rotation of the supporting rollers 28 and 29. Further, a belt charging roller 35 has been arranged at the position opposite to the supporting roller 28, where it is kept in contact with the surface of the transfer belt 22 to adsorb the transfer paper P statically thereon by charging the surface of the belt. In addition, there is a blade cleaner 36 provided on the position opposite to the supporting roller 29, where it is kept in contact with the surface of the transfer belt 22 to remove contamination on the surface of the transfer belt 22.

On the other hand, a toner image (Y) formed on the photosensitive drum 1 by the development is transferred on paper P that is held on the transfer belt 22 via the transfer roller 17 at the position where the photosensitive drum 1 and the transfer belt 22 oppose each other. The paper P on which the toner image (Y) has been transferred is continuously conveyed by the transfer belt 22 and in the same manner, a toner image (M) formed on the photosensitive drum 2, a toner image (C) formed on the photosensitive drum 3 and a toner image (Bk) formed on the photosensitive drum 4 are transferred on the paper P by respective corresponding transfer rollers 18, 19 and 20 in order.

The paper P with all the toner images transferred is separated from the transfer belt 22 and conveyed to a fixing unit 26. The toner images on the paper P are heated by the fixing unit 26, melted and fixed on the paper P by the heat applied from the fixing unit 26 and the paper P is ejected in a tray 27.

Untransferred toner remained on the photosensitive drums 1–4 are removed by the cleaners 31–34, respectively.

By the way, when plural images formed in different color components are overlapped on paper P, the images tend to shift and many methods have been proposed so far for properly overlapping images. Factors causing image misregistration will be searched and a method for removing the factors will now be explained.

Figure 2A:
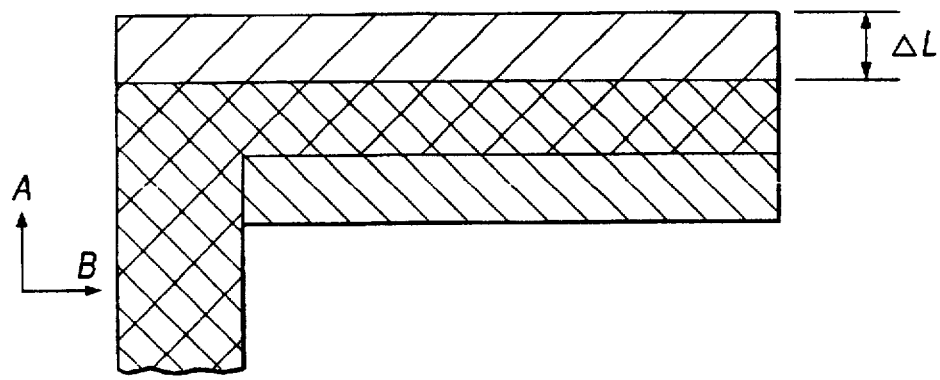
FIGS. 2A through 2C are outline diagrams showing the state of misregistration of color images produced when toner images in different colors are transferred on a sheet of paper by placing one image above the other image.
Figure 2B:
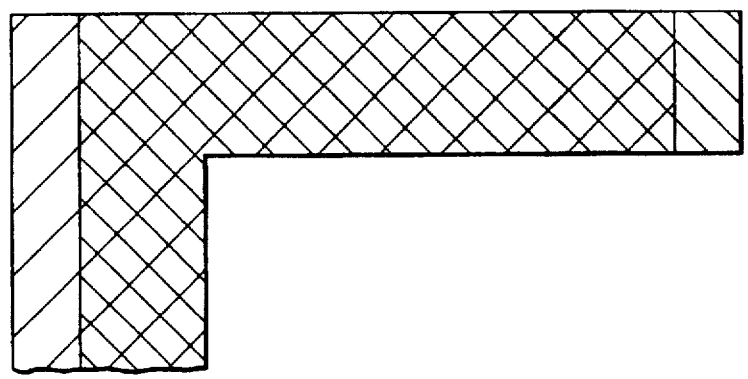
Figure 2C:
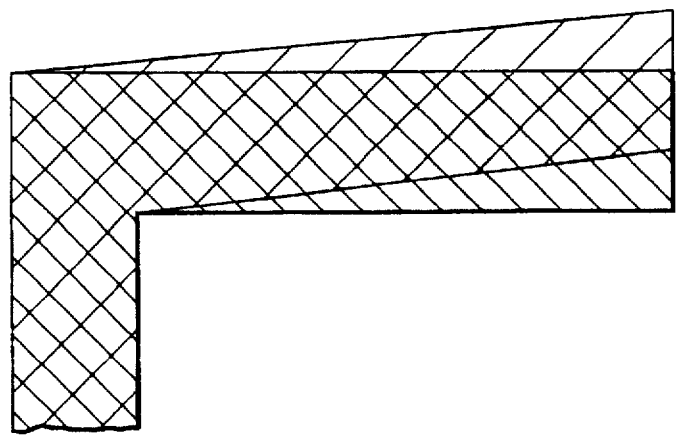
Figure 3A:
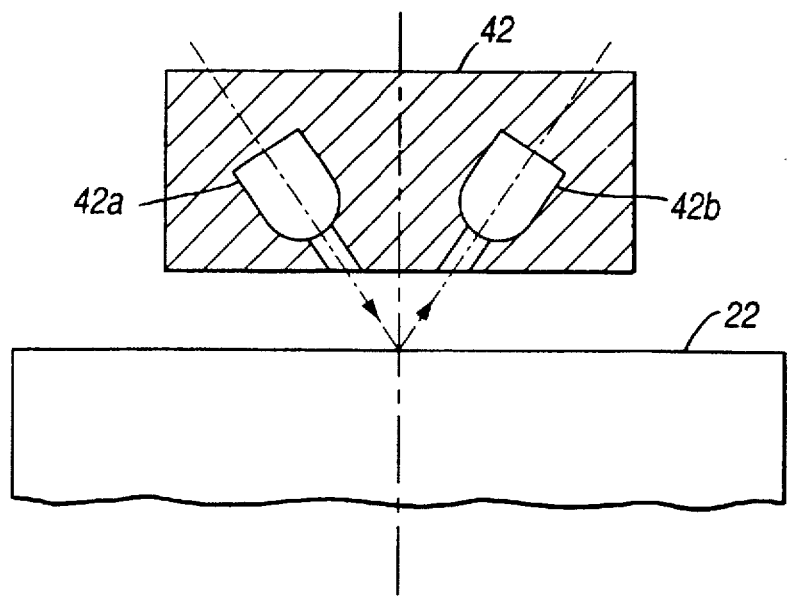
FIG. 3A is a sectional view showing the registration sensor arranged on the transfer belt.
Figure 3B:
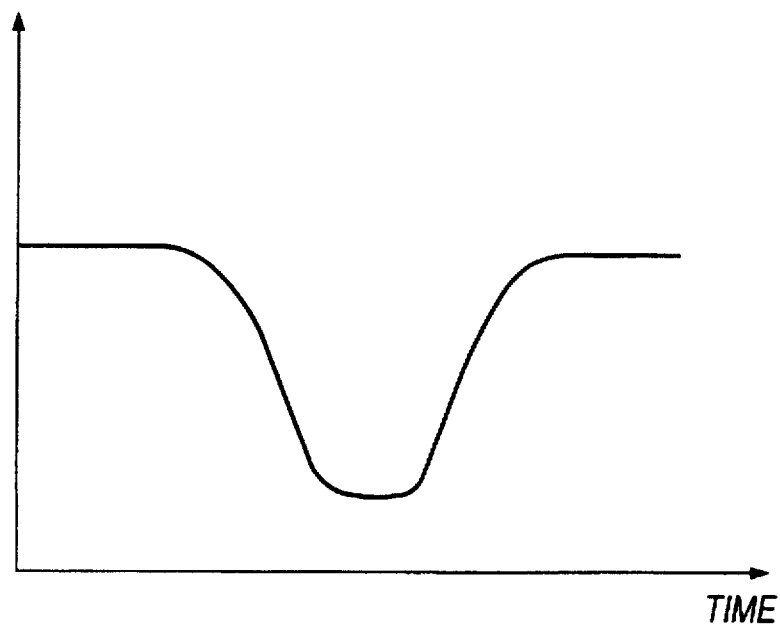
FIG. 3B is a graph showing the output state of the sensor shown in FIG. 3A.

Next, kinds and features of image misregistration will be explained referring to FIGS. 2A through 2C. According to FIG. 2A, a first image misregistration is in the direction of arrow A and may be considered as a misregistration of an image top line, that is, a misregistration in the sub-scanning direction. A misregistration of the space between the image forming portions or an offset between the axis of the photosensitive drum and that of the imaging bar is considered as this misregistration in the sub-scanning direction. The second misregistration is in the direction of arrow B as clearly seen from FIG. 2B and it can be considered to be a shift of the exposure start position. That is, it is considered to be a misregistration of the imaging bar along the axial direction of the photosensitive drum or a misregistration caused due to an individual error of a recorded dot of the imaging bar. A third misregistration is a tilted shift extending in both the main scanning and sub-scanning directions as shown in FIG. 2C. As the factors for this type of misregistration, the deviation in the degree of parallelism between the photosensitive drums and the imaging bars or the tilt of the axis of an independent photosensitive drum is considered.

Figure 4:
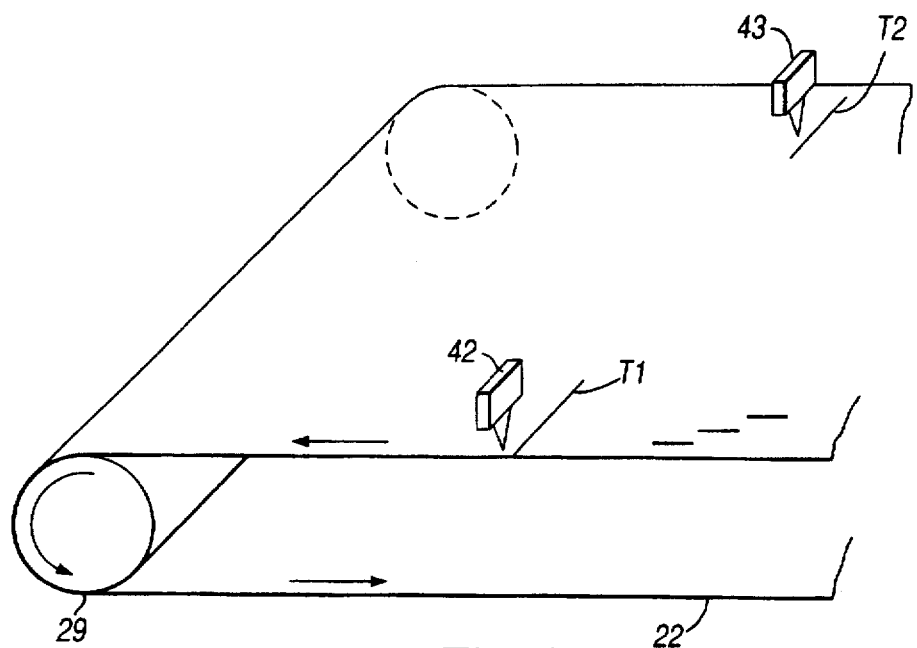
FIG. 4 is a perspective view showing the state of two registration sensors arranged on the upper side of the transfer belt in order to detect the tilted misregistration.

Next, referring to FIGS. 3A through 7, the detection of the misregistration in the sub-scanning direction and its correcting method will be explained. First, the structure of the registration sensor 42 will be explained referring to FIG. 3A. The registration sensor 42 is provided with a light emitting portion 42a and a light receiving portion 42b which receives the light projected from the light emitting portion 42a and reflected on the transfer belt 22 or a test pattern. And a change in a ratio of the reflected light from the surface of the transfer belt 22 and intercepted by a toner of a test pattern formed on the transfer belt (that is, a change in a reflectance) is detected by setting the light projected and received at an equal angle. Further, the light projecting portion 42a and the light receiving portion 42b have been arranged in the direction orthogonal to the running direction of the transfer belt 22 as shown in FIG. 4.

Figure 5:
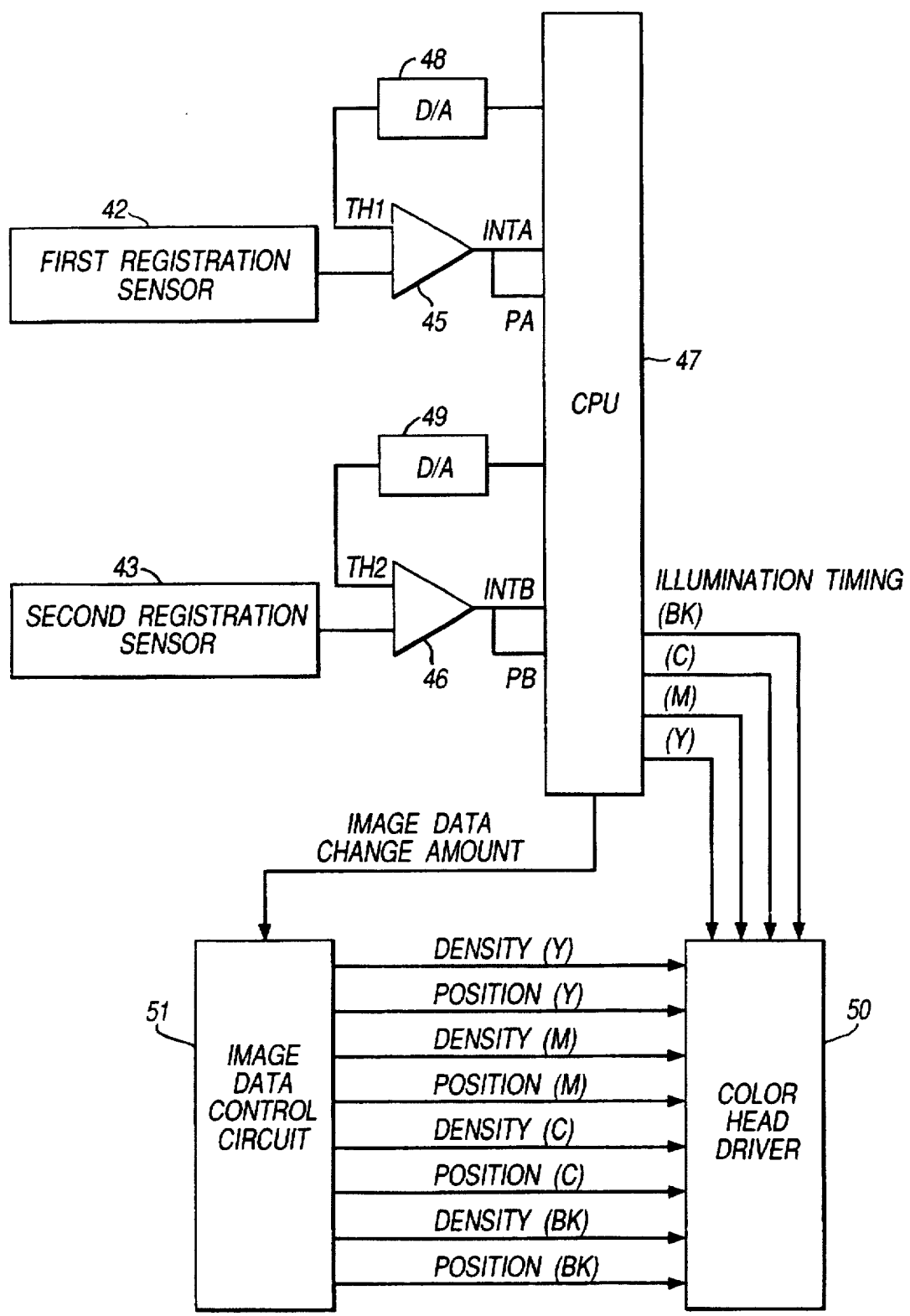
FIG. 5 is a block diagram showing the system configuration of an image forming apparatus involved in the first through the fourth embodiments of the present invention.

Next, referring to FIG. 5, the control circuit to detect the misregistration in the sub-scanning direction will be explained. When detecting a test pattern, the first and the second registration sensors 42 and 43 output the sensor outputs which are input to the non-inverted input of comparators 45 and 46, respectively. To the inverted input of these comparators 45 and 46, signals that are D/A converted by D/A converters 48 and 49 are input from a CPU 47 as threshold voltages TH1 and TH2, respectively.

On the other hand, the outputs from the comparators 45 and 46 are input to ports PA and PB and interrupt ports INTA and INTB of the CPU 47, respectively.

The CPU 47 has a function to measure a time from the exposure of a test pattern by the color imaging bars until when the interruption is made.

Further, the CPU 47 outputs a light emitting timing signal to a color head driver 50 and image data change amount to an image data control circuit 51. The image data control circuit 51 outputs a density signal and a position signal for each color to the color head driver 50.

Figure 6:
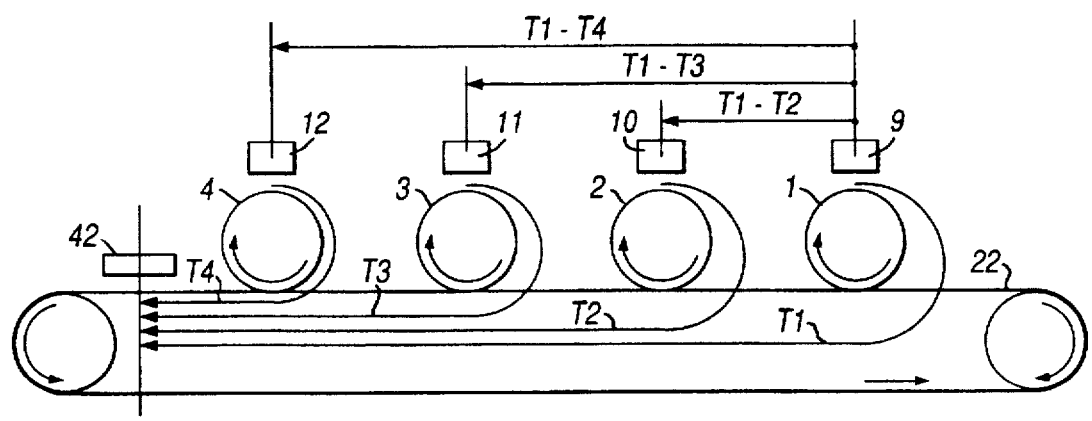
FIG. 6 is an outline diagram for explaining the sub-scanning misregistration correction.

In FIG. 6 a static latent image exposed and formed on the photosensitive drum 1 by the first imaging bar 9 is developed by the developing unit and detected T1 seconds later by the registration sensor 42. Similarly, the image formed on the photosensitive drums 2, 3 and 4 by the second, third and fourth imaging bars 10, 11 and 12, respectively are detected by the registration sensor 42 T2, T3 and T4 seconds later, respectively. From this, the actual timing for exposing the images for the photosensitive drums 2, 3 and 4 are specified by (T1–T2), (T1–T3) and (T1–T4) seconds later, respectively, relative to the exposure timing by the first imaging bar 9 (see the flowchart shown in FIG. 7).

Figure 7:
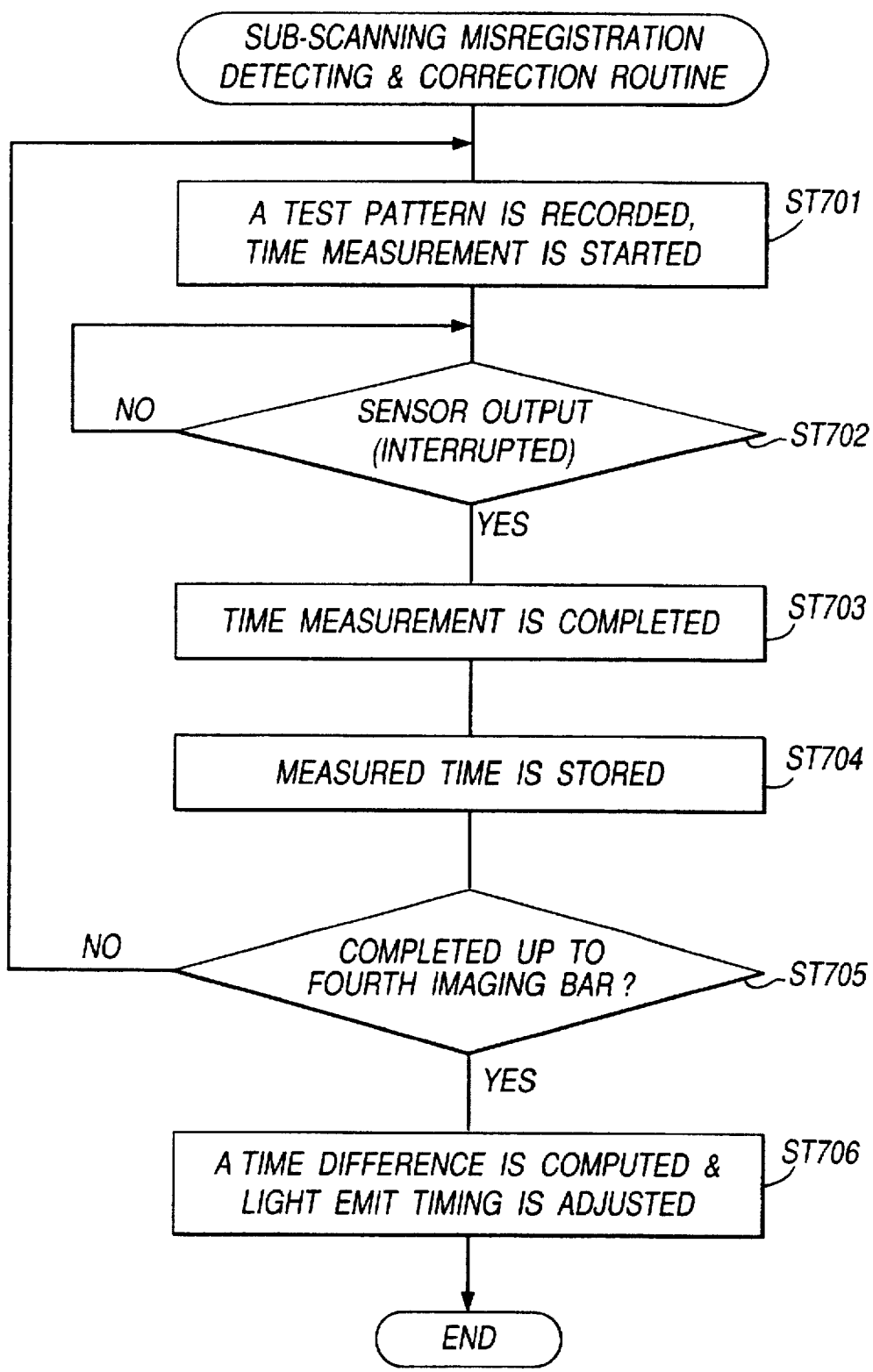
FIG. 7 is a flowchart for explaining the sub-scanning misregistration correction.

That is, as shown in the flowchart in FIG. 7, a test pattern (a latent image) is formed on the photosensitive drum 1 by the first imaging bar 9 and at the same time, the CPU 47 starts a time measurement using a timer (not shown) in the CPU 47 (ST701). This test pattern (the latent image) is developed by the developing unit 13 and transferred onto the transfer belt 22. Upon detecting the test pattern transferred on the transfer belt 22, the registration sensor 42 outputs the sensor output and the interruption signal INTA to the CPU 47 (ST702). In this embodiment, the test pattern is transferred onto the transfer belt 22, however the test pattern may be transferred onto the transfer paper P conveyed by the transfer belt 22.

When receiving the interruption signal INTA, the CPU 47 terminates the time measurement of the internal timer (ST703).

The CPU 47 stores a time T1 measured by the timer in a memory (not shown) contained in the CPU 47 (ST704).

The steps 701–704 are repeated up to the last fourth imaging bar 12. The measured times T1, T2, T3 and T4 are stored in the memory in the CPU 47 (ST705).

The CPU 47 computes T1–T2, T1–T3 and T1–T4 and based on the light emitting timing of the first imaging bar 9, decides the light emitting timings in the succeeding image forming to be performed after "T1–T2" for the second imaging bar, after "T1–T3" for the third imaging bar and after "T1–T4" for the fourth imaging bar (ST706).

That is, when actually forming images, it becomes possible to align the leading lines of respective colors by setting the exposure start timings for the second color and succeeding colors at T1–T2, T1–T3 and T1–T4 after the first color exposure start time. That is, it becomes possible to adjust the misregistration in the sub-scanning direction.

Figure 8:
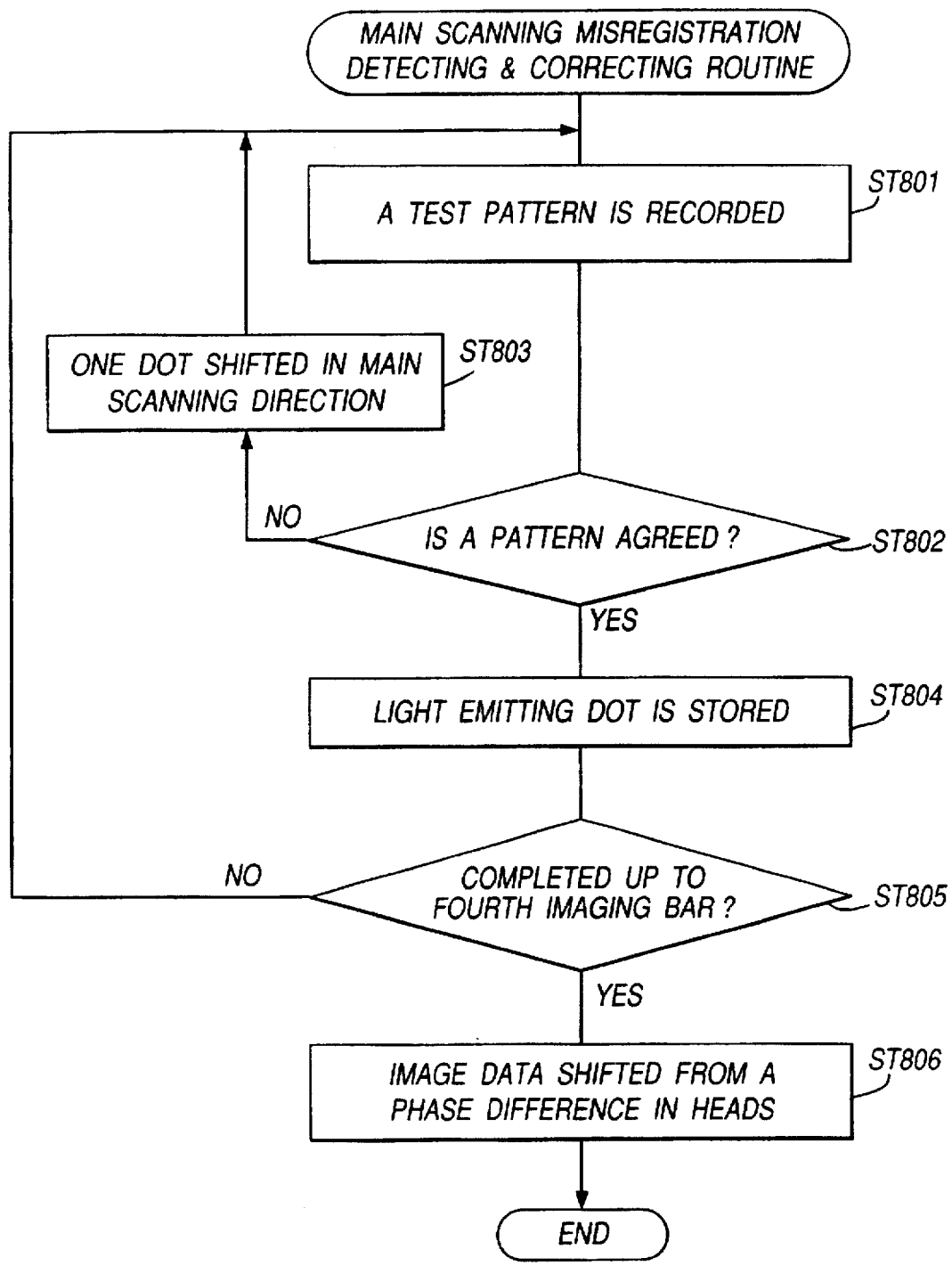
FIG. 8 is a flowchart for explaining the main scanning misregistration correction.

Next, the detection of the misregistration in the main scanning direction and its correcting method will be explained referring to the flowchart shown in FIG. 8. A test pattern (a latent image) is formed on the photosensitive drum 1 by the first imaging bar 9. This test pattern is formed by a first dot of the first imaging bar 9. The test pattern (the latent image) is developed by the developing unit 13 and the developed toner image is transferred onto the transfer belt 22.

If the test pattern comprising the toner image transferred on the transfer belt 22 was not detected by the registration sensor 42, the CPU 47 forms a test pattern (by shifting one dot in the main scanning direction) by the second dot of the first imaging bar 9 and repeats Step ST801 (ST802 and ST803).

Further, when the registration sensor 42 detects a test pattern, the registration sensor 42 outputs a sensor output and the interruption signal INTA to the CPU 47 (ST802).

When receiving the interruption signal INTA, the CPU 47 stores the light emitting dot that formed the detected pattern in a memory (not shown) contained in the CPU 47 (ST804).

Steps ST801–ST804 are repeated up to the fourth imaging bar 12. The light emitting dots of respective imaging bars which formed the test patterns detected by the registration sensor are stored in the memory contained in the CPU 47 (ST805).

The CPU 47 transmits an image data change amount (that is, a phase difference) to the image data controller 51. The image data controller 51 shifts image data stored in the contained in image memory according to this image data change amount (ST806).

That is, when one of the test patterns formed for the first, second, third columns and so on of the first imaging bar 9 is detected by the registration sensor 42, the output of the registration sensor 42 is supplied to the CPU 47. The test pattern recorded by the first column of the first imaging bar 9, the test pattern recorded by the second column, the test pattern recorded by the third column and so on are formed in order and the light emitting columns used for the forming of the test patterns output from the registration sensor 42 are stored in a memory (not shown) through the CPU 47. Thus, a phase difference between respective imaging bars can be detected. When image data stored in the image memory are shifted by providing the image data changing amount to the image data controller 51 according to this phase difference, it becomes possible to correct the misregistration without changing (mechanically adjusting) the positions of the imaging bars.

As described above, a phase difference regarding the second through the fourth imaging bars 10, 11 and 13 are obtained in order and it becomes possible to align the writing positions in the main scanning direction of respective photosensitive drums 2, 3 and 4.

Next, the detection of tilted misregistration and its correcting method will be explained referring to FIG. 9.

A test pattern (a latent image) is recorded on the photosensitive drum 1 by the first imaging bar 9. At the same time, the CPU 47 starts the time measurement using timers 1 and 2 (not shown) in the CPU 47 (ST901).

Figure 10:
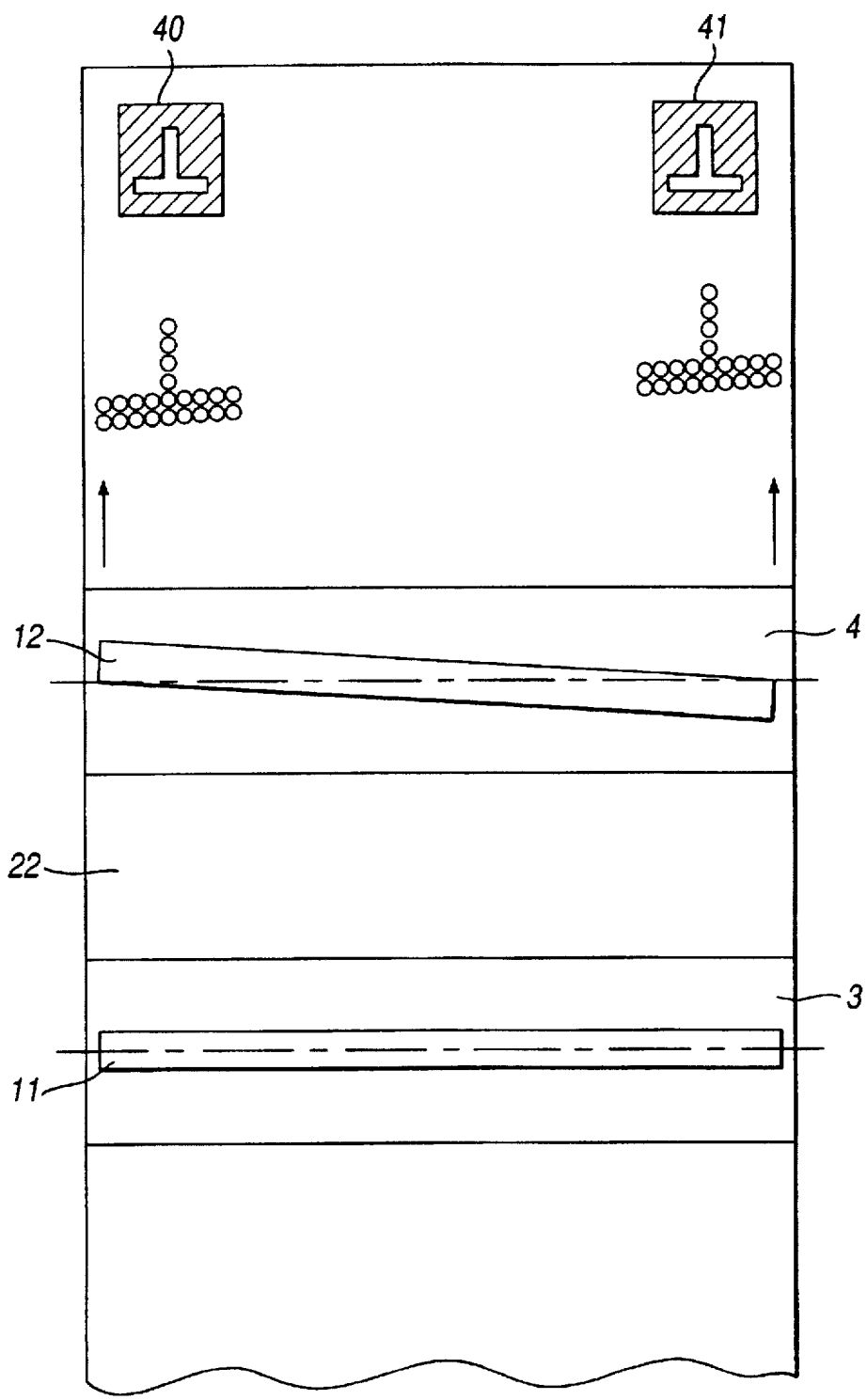
FIG. 10 is an outline diagram for explaining a method for detecting the degree of parallelism of the imaging bars.

The test pattern (the latent image) is developed by the developing unit 13, the developed toner image is transferred onto the transfer belt 22 (the test patterns 40 and 41) (FIG. 10).

When the output of the first registration sensor 42, that is, the interruption signal INTA is first output, the CPU 47 terminates the time measurement by a first timer (not shown) and stores the measured time t1 in the memory contained in the CPU 47 (ST902, ST911 and ST912).

Then, when the output of the second registration sensor 43, that is, the interruption signal INTB is output, the CPU 47 terminates the time measurement by a second timer (not shown) and stores the measured time t2 in the memory (ST913, ST914 and ST915).

The CPU 47 computes the tilt from a difference between the measured times (ST909).

For instance, as t2>t1 assuming that a tilt angle is θ, a distance between the detecting positions of the first registration sensor 42 and the second registration sensor 43 is L, and the processing speed (the belt running speed) is V, the tilt angle θ is computed according to the following equation:

$$\tan \theta = (t2-t1)/VL$$

The CPU 47 stores this tilt angle in the memory contained in the CPU 47 (ST910).

Further, when the output of the second registration sensor 43, that is, the interruption signal INTB is first output, the CPU 47 terminates the time measurement by the second timer (not shown) and stores the measured time t2 in the memory contained in the CPU 47 (ST903, ST904 and ST905).

Then, the output of the first registration sensor 42, that is, the interruption signal INTA is output, the CPU 47 terminates the time measurement by the first timer (not shown) and stores the measured time t1 in the memory (ST906, ST907 and ST908).

The CPU 47 computes a tilt from a difference between the measured times (ST909) and stores the tilt angle in the memory contained in the CPU 47 (ST910).

Further, when the output of the first registration sensor 42 (the interruption signal INTA) and the output of the second registration sensor 43 (the interruption signal INTB) are concurrently output, the CPU 47 judges that there exists no tilt (ST916 and ST917).

The operations described above are repeated up to the fourth imaging bar 12 (ST918).

When the operations described above have been carried out up to the fourth imaging bar 12, the CPU 47 computes (θ=0) image data so that the tilt of all the imaging bars is eliminated and outputs the image data changing amount to the image data controller 51. The image data controller 51 rearranges data on the built-in image data memory according to the received image data changing amount (ST919).

Figure 9:
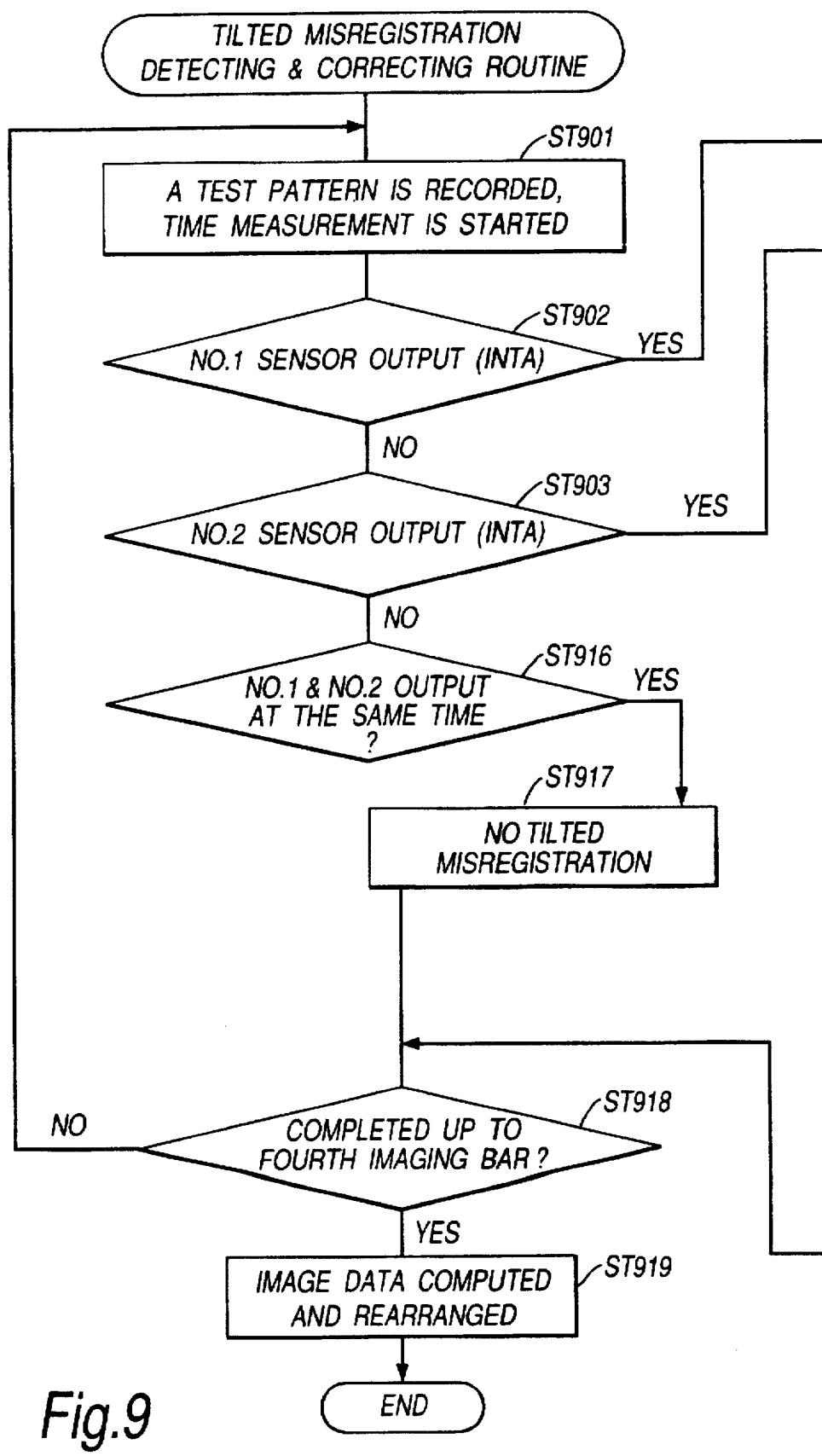
FIG. 9 is a flowchart for explaining the tilted misregistration correction.
Figure 9:
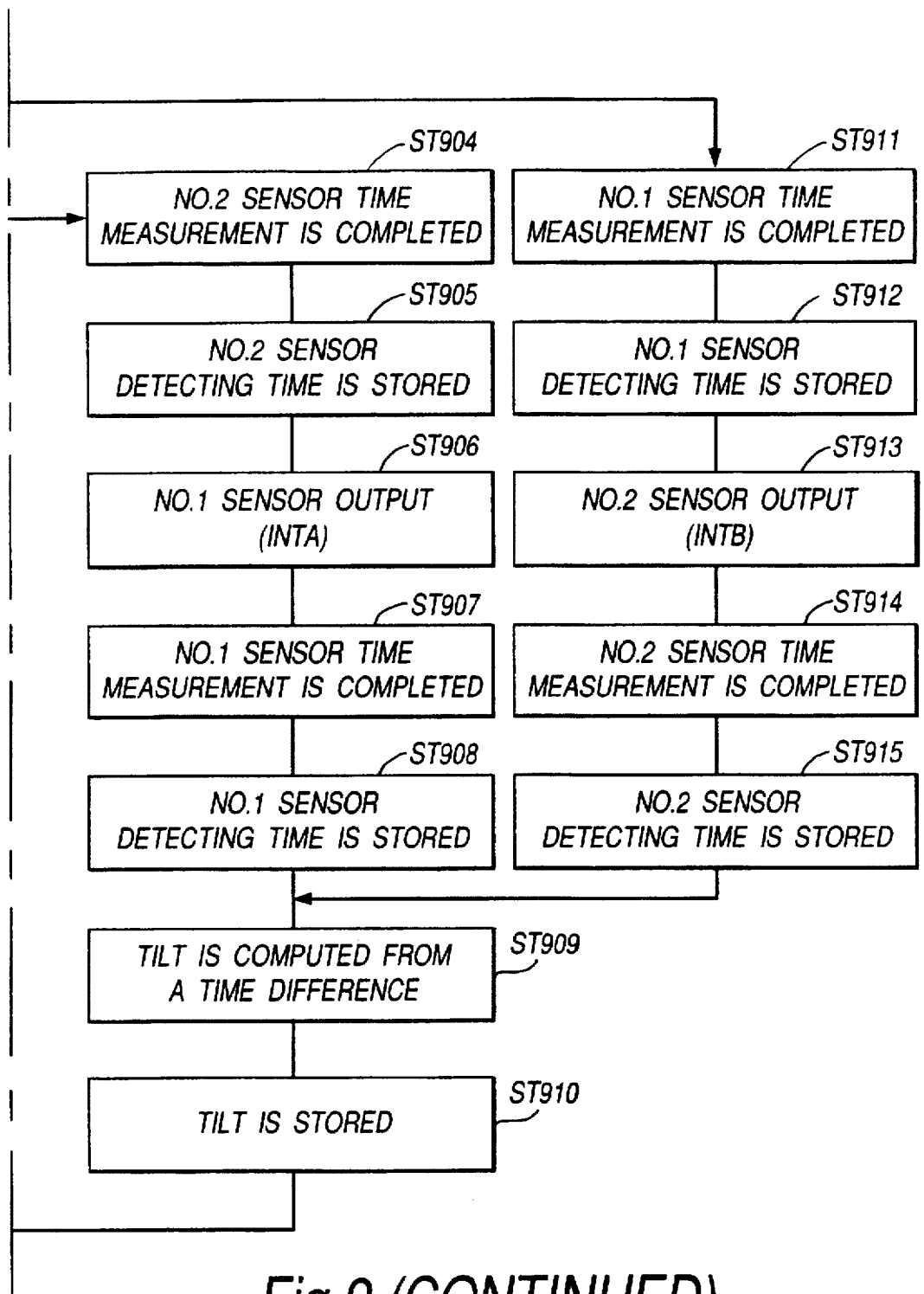

That is, when the first and the second registration sensors 42 and 43 are arranged at both ends of the transfer belt 22, respectively, as shown in FIG. 4 and if there exists a time difference between the test patterns 40 and 41 (shown in FIG. 10) when they pass through these sensors, it is possible to detect the tilt (the degree of parallelism) of the imaging bars from this time difference by executing the process shown in the flowchart in FIG. 9.

Next, the correction of the misregistration of the degree of parallelism (a kind of the tilt misregistration) resulting from the shift of the axes of photosensitive drums or imaging bars will be explained.

Here, two imaging bars 11 and 12 will be used for the explanation.

In FIG. 10, it is assumed that the third imaging bar 11 has been arranged in parallel with the registration sensors 42 and 43 (as shown in FIG. 4) and the fourth imaging bar 12 has been arranged not in parallel with the sensors.

Figure 11A:
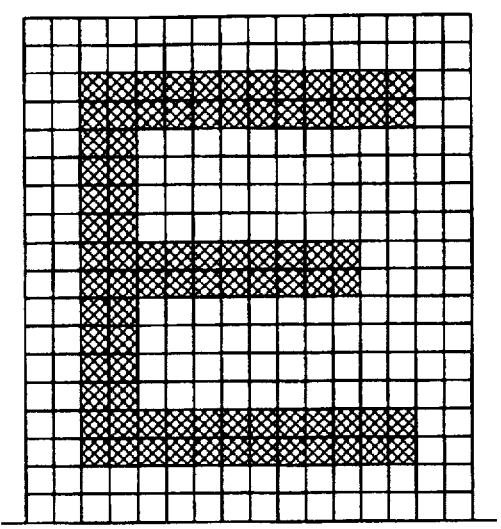
FIGS. 11A through 11C are outline diagrams for explaining overlapped misregistration of the imaging bars having different degrees of parallelism by an image memory.
Figure 11B:
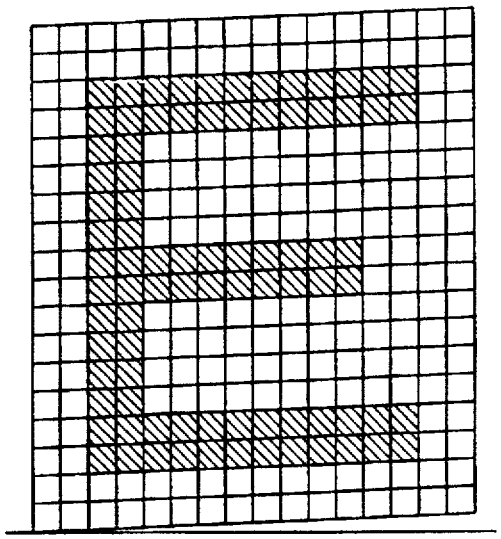
Figure 11C:
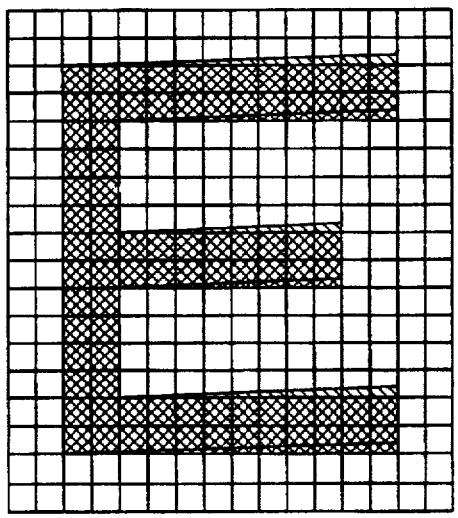
Figure 12A:
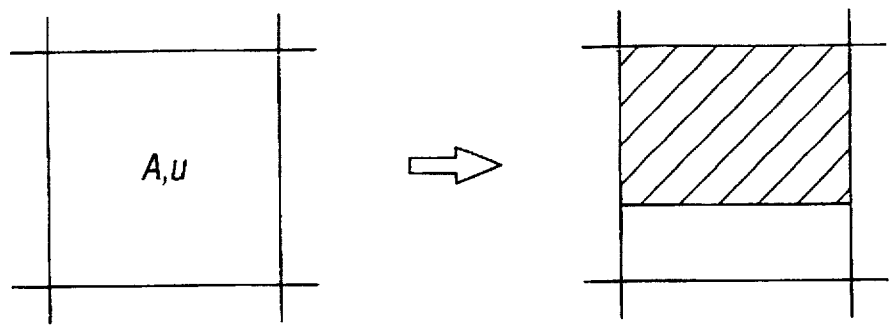
FIGS. 12A and 12B are outline diagrams showing the difference of printings according to the position information of the imaging bars.
Figure 12B:
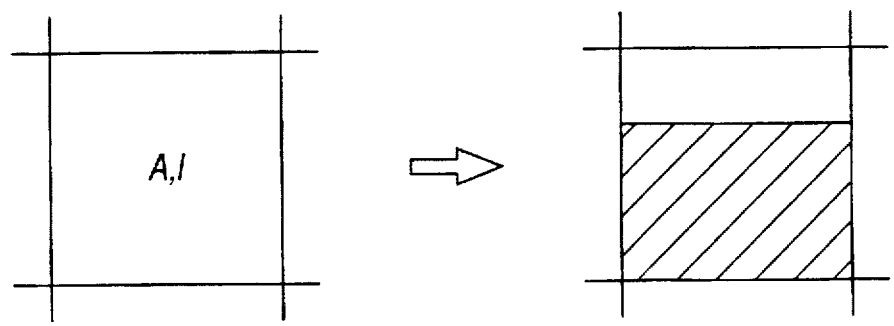

FIGS. 11A through 11C are the outline diagrams virtually showing a two-dimensional data memory as an image data memory of the imaging bars and the grids are equivalent to the light emitting portions of the imaging bars and have 0-F density information and position information in the sub-scanning direction in dots. For instance, in the case of the density A, two kinds of density are formed and selectable; the density to be recorded at the upper side (u: upper) according to the position information as shown in FIG. 12A and the density to be recorded at the lower side (l: lower) as shown in FIG. 12B. Further, the imaging bars also have the recording capacity corresponding to the density information and the position information.

Here, when considering a case to record an alphabetic character E twice by overlapping it by the third imaging bar 11 (Density F) and the fourth imaging bar 12 (Density F), the image data memories of the imaging bars 11 and 12 are virtually identical to each other as shown in FIG. 11A but as the fourth imaging bar 12 has been assumed to have been fixed not in parallel with the registration sensors, the image memory of, for instance, the fourth imaging bar 12 can be approximated as being tilted as shown in FIG. 11B.

When both images have been overlapped, an overlapping misregistration is produced as shown in FIG. 11C.

Here, the correction of misregistration without adjusting the mechanical degree of parallelism of the imaging bars will be considered. That is, the image data memory of the fourth imaging bar 12 is considered as being kept tilted. In this case, data in the image memory should be rearranged.

Figure 13A:
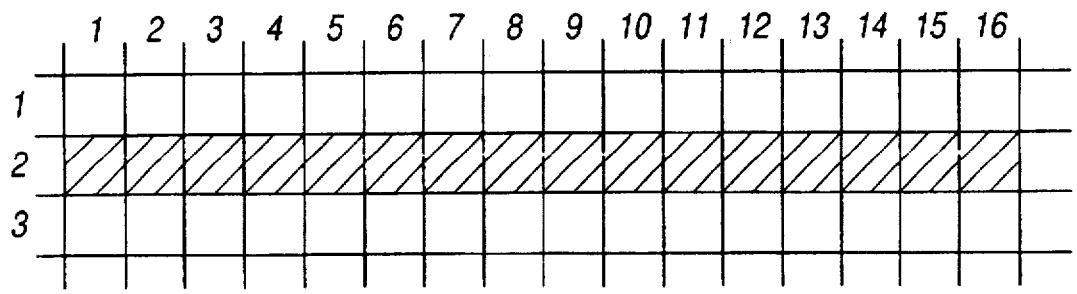
FIGS. 13A through 13C are outline diagrams showing a method for correcting the degree of parallelism of the imaging bars.
Figure 13B:
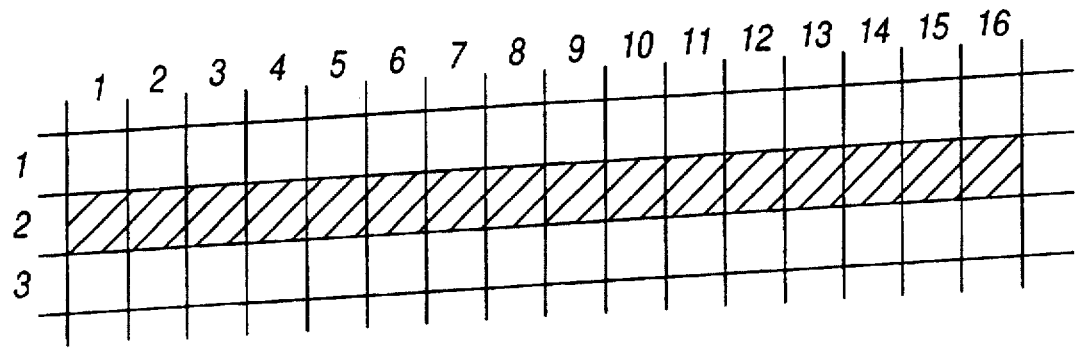
Figure 13C:
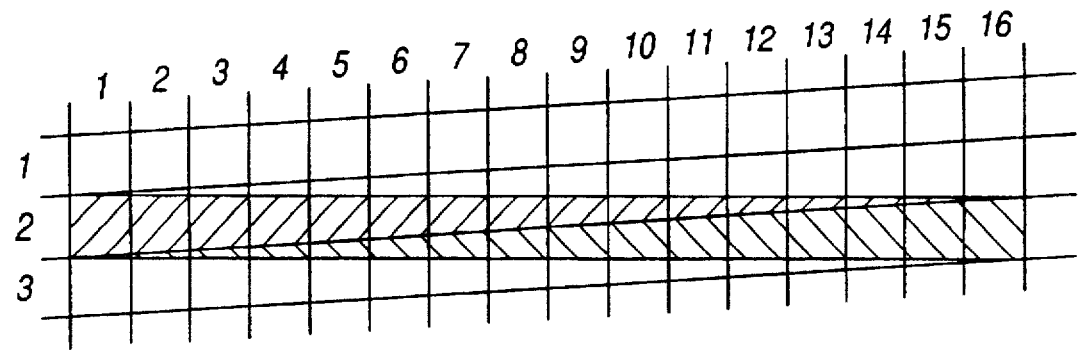

For example, a case where a local memory in 3 rows×16 columns (16 dots) is specified and a straight line in density F is recorded from 1 to 16 columns of the second row of the memory is considered as shown in FIG. 13A. FIG. 13A is a conceptual diagram of the image data memory of the third imaging bar 11, FIG. 13B is that of the image data memory of the fourth imaging bar 12 and it is assumed that FIG. 13B is tilted by 1 dot in the sub-scanning direction at the right end of the straight line. When FIGS. 13A and 13B are rewritten with density information of the memories shown by 0-F and position information by u, l in order of density and position, FIGS. 14A and 14B are obtained. Regarding density F and 0, position information is not described as it is not required.

Here, if an original straight line to be expressed by a memory having no tilt is overlapped on a memory having the tilted portion, density and position information of the memory of the imaging bar 12, that are to be rearranged can be checked. This example shows a state where the memory information of the second row of the fourth imaging bar 12 has been distributed and rearranged at the second row or the third row of the fourth imaging bar 12. That is, FIG. 14C agrees with the rearranged result. Since the original density information is F, it is distributed to the upper and lower memories and further, regarding the position information, the first row is recorded at the lower side (l) and the second row is recorded at the upper side (u).

Further, although the example described above has been explained locally using a memory of 16 columns, the number of columns are actually n pieces and therefore, it is sufficient if density and position information are proportionally allocated. An example of this proportional allocation is shown in FIG. 15.

Figures 15, 16:
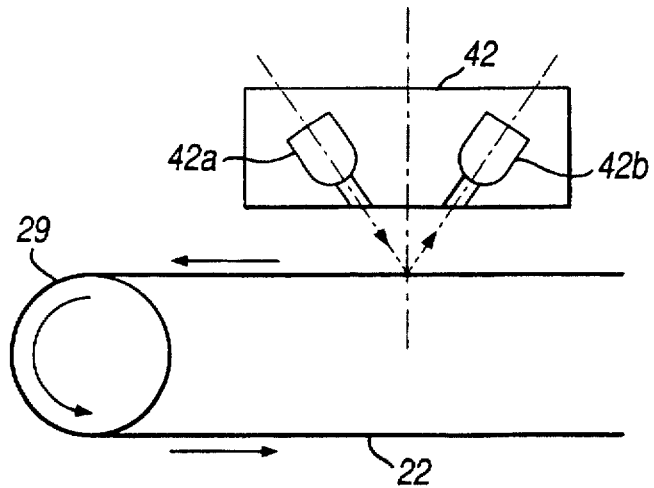
FIG. 15 is an outline diagram showing a method for correcting the degree of parallelism of the imaging bars.
FIG. 16 is an outline diagram showing the relationship of arrangement of the transfer belt and the registration sensor in the first embodiment of the present invention.
Figure 17:
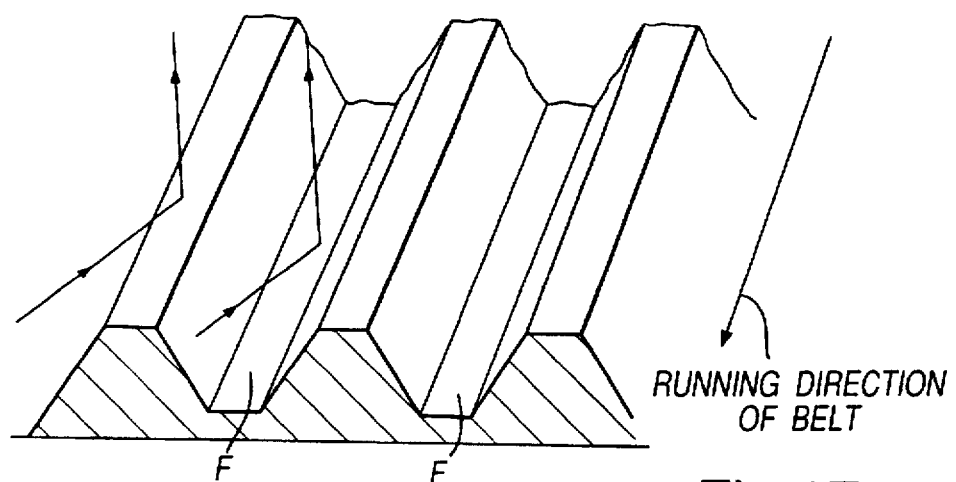
FIG. 17 is an outline diagram showing the state of the projected light and the reflected light from the registration sensor in the first embodiment of the present invention.

Next, a first embodiment of the present invention will be further explained referring to FIGS. 16 and 17. In this first embodiment, the light projecting portion 42a and the light receiving portion 42b of the registration sensor 42 are arranged in parallel with the running direction of the transfer belt 22. The light projecting portion 42a and the light receiving portion 42b are set in the direction so that the light projection and receiving angles become equal and the change in the ratio (that is, the change in the reflectance) when the reflected light from the surface of the transfer belt 22 is intercepted by the toner forming a test pattern on the transfer belt 22 is detected.

This structure will make the change in the reflectance of the transfer belt 22 small. That is, if the light projecting portion 42a and the light receiving portion 42b were arranged at the right angle to the running direction of the transfer belt 22, the reflecting components decrease remarkably. But if the incident light/reflected light directions are in parallel with the running direction of the transfer belt 22 (that is, the scores F) as shown in FIG. 17, the reflecting component decrease is less.

Therefore, according to this first embodiment of the present invention, it is possible to reduce the change in the reflectance resulting from the scores F of the transfer belt 22 and supply the stabilized output to the registration sensor 42.

Figure 18:
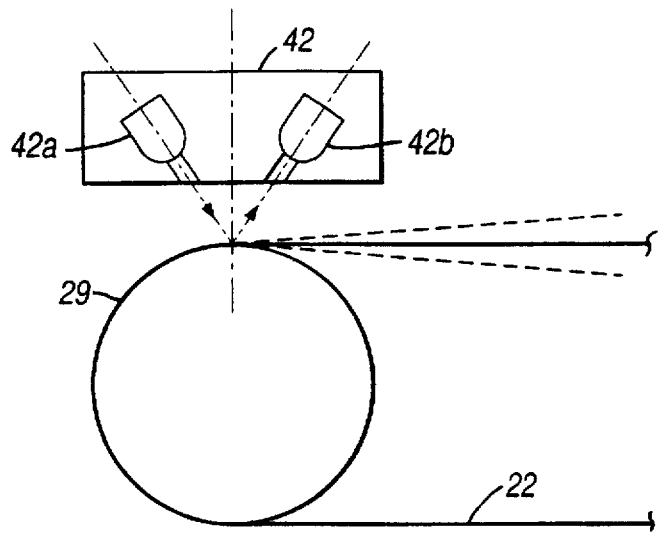
FIG. 18 is an outline diagram showing the relationship of arrangement of the transfer belt and the registration sensor in the second embodiment of the present invention.

Next, a second embodiment of the present invention will be explained referring to FIG. 18. In FIG. 18, a reference numeral 29 denotes a supporting roller for supporting and conveying the transfer belt 22 and 42 denotes the registration sensor as a detector, and the registration sensor 42 is arranged on the supporting roller 29.

As shown above, the registration sensor 42 was arranged on the supporting roller 29 for supporting the transfer belt to detect a test pattern. As a result, there is no vertical vibration of the transfer belt 22 and a focusing distance remains unchanged.

Therefore, it is possible to get the stabilized output from the registration sensor 42.

Figure 19:
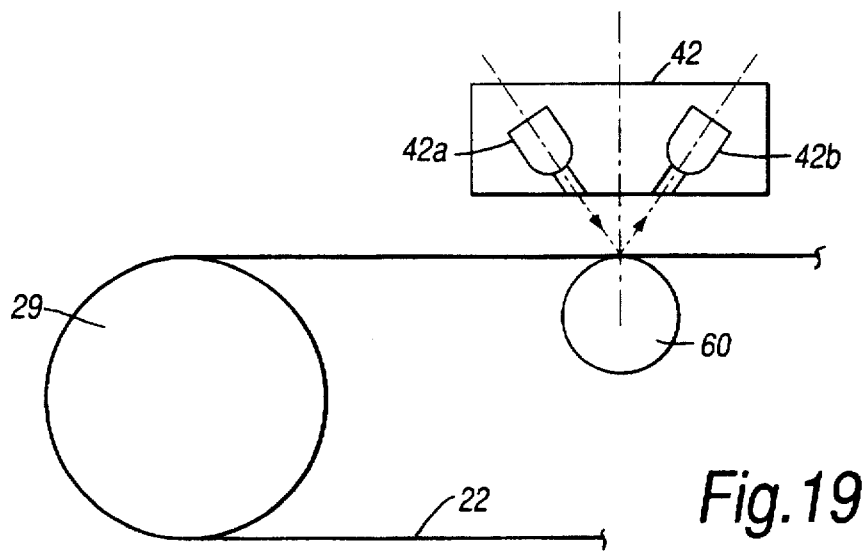
FIG. 19 is an outline diagram showing the relationship of arrangement of the transfer belt and the registration sensor in the third embodiment of the present invention.

Next, a third embodiment of the present invention will be explained referring to FIG. 19. In FIG. 19, a reference numeral 29 denotes the supporting roller for supporting and conveying the transfer belt 22 and 42 denotes the registration sensor as a detector. The registration sensor 42 is arranged on a vibration control roller 60 which controls the vertical vibration of the transfer belt 22. Here, this roller 60 is set at the position where the transfer belt 22 is lifted upward from the contacting surfaces between the conveyor roller 29 and the transfer belt 22.

If the registration sensor 42 was set on the vibration controller 60 to detect a test pattern as described above, a focus distance remains unchanged as the transfer belt 22 does not vibrate vertically. That is, the stabilized output can be obtained from the registration sensor 42.

Next, a fourth embodiment will be explained. As described above, for the misregistration in the sub-scanning direction, a time is measured from the exposure of a test pattern on the photosensitive drum 1 to the detection of the test pattern by the registration sensor 42. Further, for the tilting misregistration, a time difference is measured between the outputs of the registration sensors 42 and 43 mounted at the left and the right points in the paper conveying direction.

However, according to this method, the measuring result is largely affected by the change in the speed of the photosensitive drum 1 and the transfer belt 22. The motor for driving the photosensitive drum 1 and the transfer belt 22 is PLL controlled and does not cause a large speed change in the normal printing operation but may cause a large speed change due to some sudden cause. If such a speed change is caused while the registration sensor is detecting a misregistration, the misregistration is not correctable by a correction value at that time. Further, even when the motor is PLL controlled, small speed changes take place regularly and therefore, a measured value may vary. In this case, it is not feasible to correct the misregistration of color images stably.

In this fourth embodiment, the misregistration of color images measurement is performed several times, the measured results are averaged and based on the average value, the correction is made.

Figure 20:
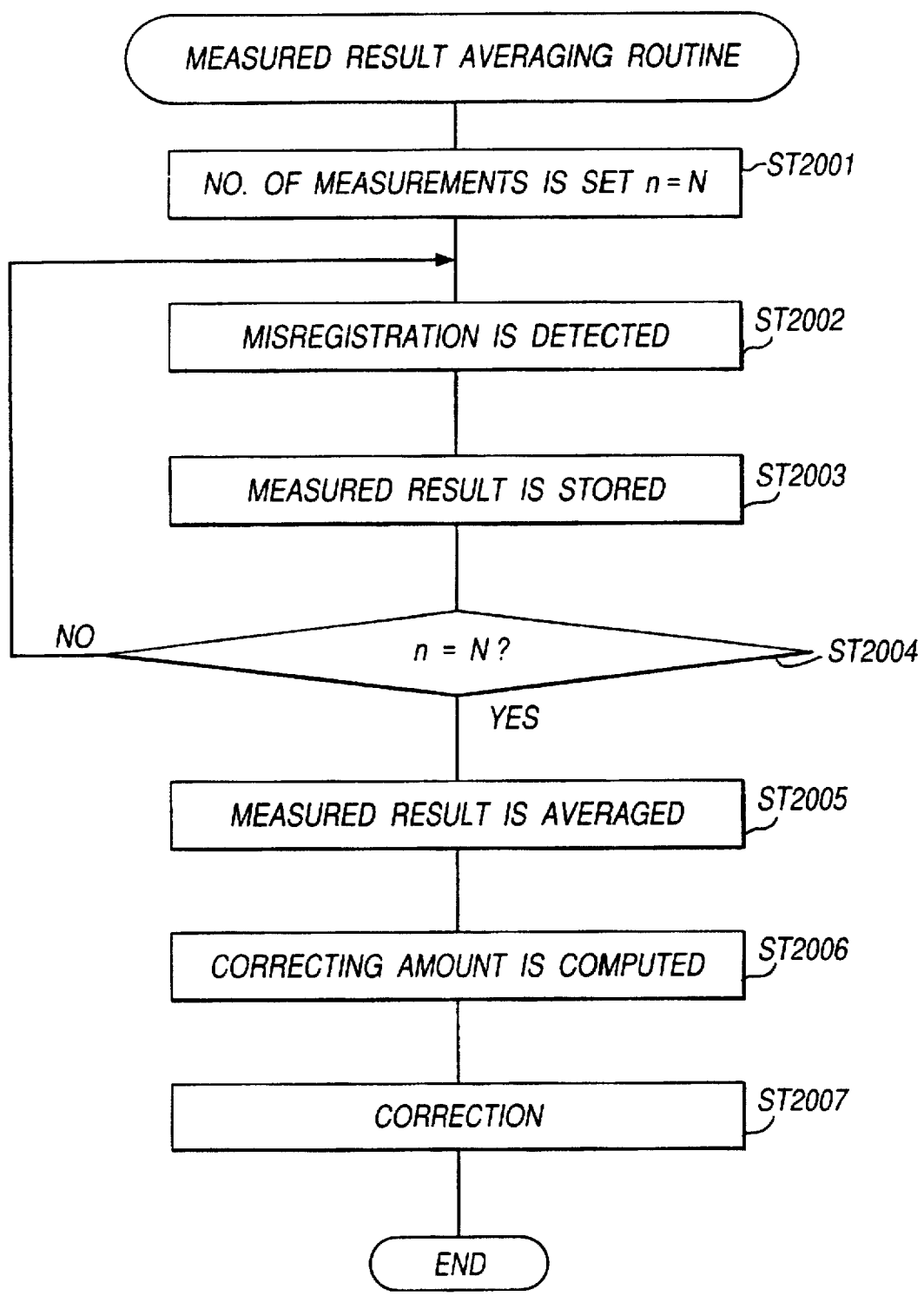
FIG. 20 is a flowchart for explaining a measured result averaging routine in the fourth embodiment of the present invention.

That is, in this fourth embodiment, the process is executed as shown by the flowchart shown in FIG. 20. First, the number of measurements is set by user (ST2001). If it is not set by user, a value set by a maker when shipped from the factory is used or a value set by a maintenance person at the time of maintenance is used. Here, this value is assumed to be N.

The CPU 47 executes the measurements based on the set number of measurements. The CPU 47 performs the first time of misregistration detection according to the misregistration detection routine in various directions (FIGS. 7, 8 and 9) and stores the measured results in the memory contained in the CPU 47 (ST2003).

Executing the measurements up to N times, the CPU 47 stores the measured results in the memory. Upon completion of the measurements by N times, the CPU 47 averages the measured results stored in the memory and obtains an average value (ST2005). Further, using this average value, the CPU 47 computes correction values (ST2006) and makes the correction based on these correction values (ST2007).

Figure 21:
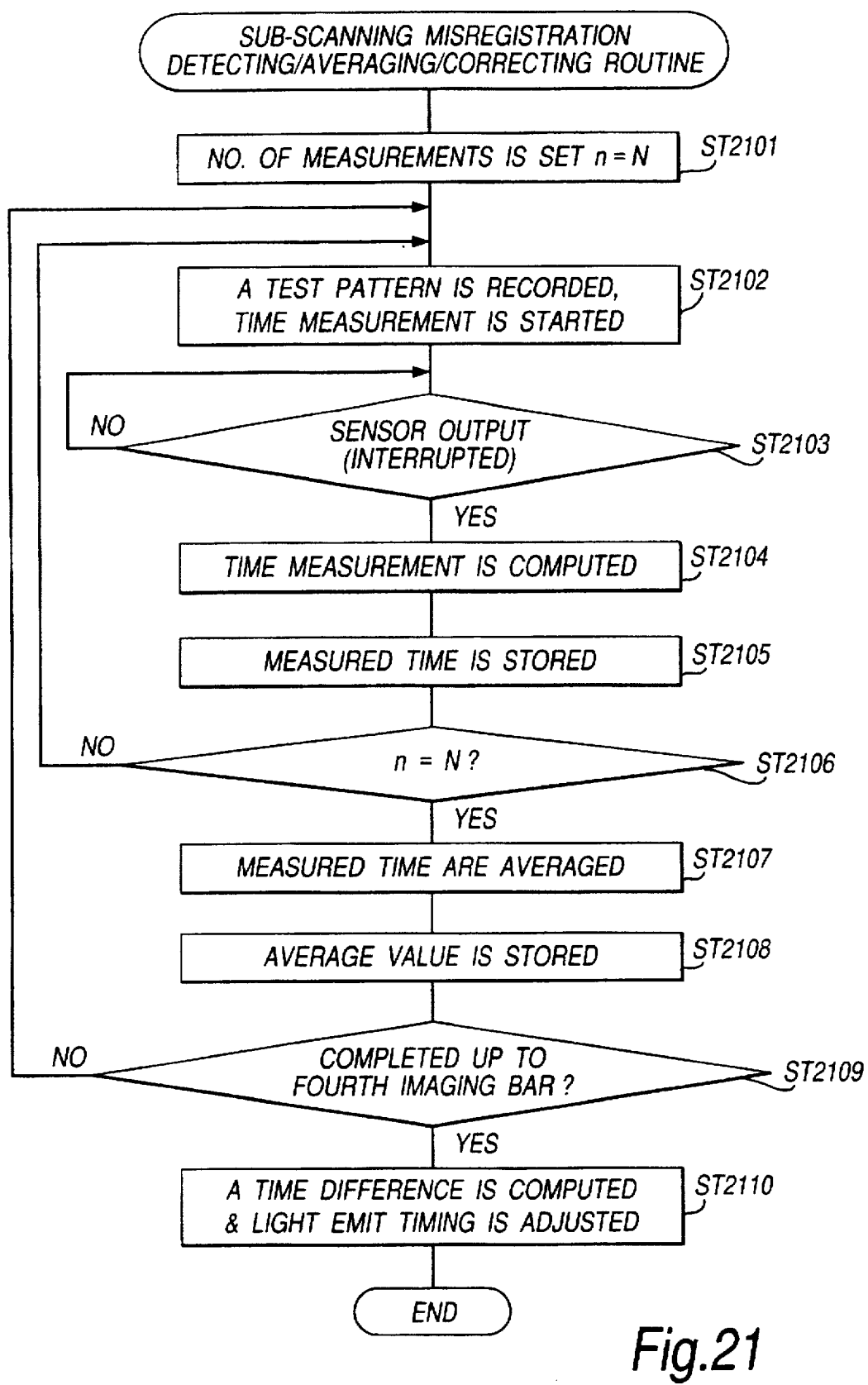
FIG. 21 is a flowchart for explaining a sub-scanning misregistration detecting/averaging/correcting routine in the fourth embodiment of the present invention.

Next, the sub-scanning detection/correction will be explained referring to the flowchart shown in FIG. 21. A user inputs the number of measurements to be set (ST2101). If it is not set by user, a value set by a maker when shipped from the factory or a value set by a maintenance person at the time of maintenance is used. (Here, this set value is N.)

The CPU 47 executes the measurements based on the set number of measurements. As Steps ST2102–ST2105 are identical to Steps ST701–ST705, the explanations thereof will be omitted. T11 is measured by the first measurement and stored in the memory.

The CPU 47 executes the above operation repetitively by N times and stores the measuring times (T11-T1N) in the memory of the CPU 47.

Upon completion of the measurements by N times, the measured times are averaged (ST2107):

T1AVG=(T11+T12+. . . +T1N)÷N

Further, the CPU47 stores the averaged result (T1AVG) in the memory (ST2108).

The operation described above is repeated up to the fourth imaging bar 12 and the averaged times (T2AVG, T3AVG and T4AVG) are stored in the memory (ST2108 and ST2109).

T2AVG=(T21+T22+. . . T2N)÷N
T3AVG=(T31+T32+. . . T3N)÷N
T4AVG=(T41+T42+. . . T4N)÷N

The CPU computes a correction value using the average value. In the case of the sub-scanning misregistration, the light emitting timings of the second, third and fourth imaging bars are computed based on the light emitting timing of the first imaging bar (ST2110).

The light emitting timing of the second imaging bar 10 based on the light emitting timing of the first imaging bar 9 is: T1AVG−T2AVG The light emitting timing of the third imaging bar 11 based on the light emitting timing of the first imaging bar 9 is: T1AVG−T3AVG The light emitting timing of the fourth imaging bar 12 based on the light emitting timing of the first imaging bar 9 is: T1AVG−T4AVG Based on the light emitting timing of the first imaging bar 9 (Y), the CPU 47 decides the light emitting timing for the image forming from next time to be after "T1AVG−T2AVG" for the second imaging bar 10 (M), after "T1AVG−T3AVG" for the third imaging bar 11 (C) and after "T1AVG−T4AVG" for the fourth imaging bar 12(Bk) (ST2110).

As explained above, for the misregistration in the sub-scanning direction, a time from the exposure of a test pattern on the photosensitive drum 1 to the detection of the test pattern by the registration sensor 42 is measured. Now, executing the measurement N times, the misregistration in the sub-scanning direction will be corrected based on the average value of the measured values.

An electrostatic latent image of a test pattern is formed on the photosensitive drum 1 by the first imaging bar 9. The electrostatic latent image of the test pattern is developed by the developing unit 14 and this developed toner image is transferred onto the transfer belt 22. The CPU 47 measures a time (T11) needed after the exposure is started by the first imaging bar 9 till the registration sensor 42 detects the toner image of the test pattern, the sensor output is output and the interruption is made and the measured result is stored in the memory.

The operation described above is repeated for a set number of times (N times). The measured times have been stored as T11–T1N and this result is averaged (T1AVG= (T11+T12+. . . +T1N)÷N). T1AVG is a time from when the first imaging bar 9 exposes a test pattern on the photosensitive drum 1 till when the registration sensor 42 detects the test pattern. The above operation is repeated up to the fourth imaging bar 12, and times needed are measured and averaged (to obtain T2AVG, T3AVG and T4AVG.

Then, computing time differences from T1AVG, T2AVG, T3AVG and T4AVG, the light emitting timings are adjusted. That is, when recording an image, the exposure start timings on and after the second color are decided as a time passed by "T1AVG−T2AVG", "T1AVG−T3AVG" and "T1AVG−T4AVG" after starting the first color exposure.

Thus, even if such a change was caused while the registration sensor 42 is detecting misregistration of color images or when a small speed change is caused regularly in the rotation of the motor driving of the photosensitive drum 1 and the transfer belt 22, it is possible to correct misregistration of color images stably.

Figure 22:
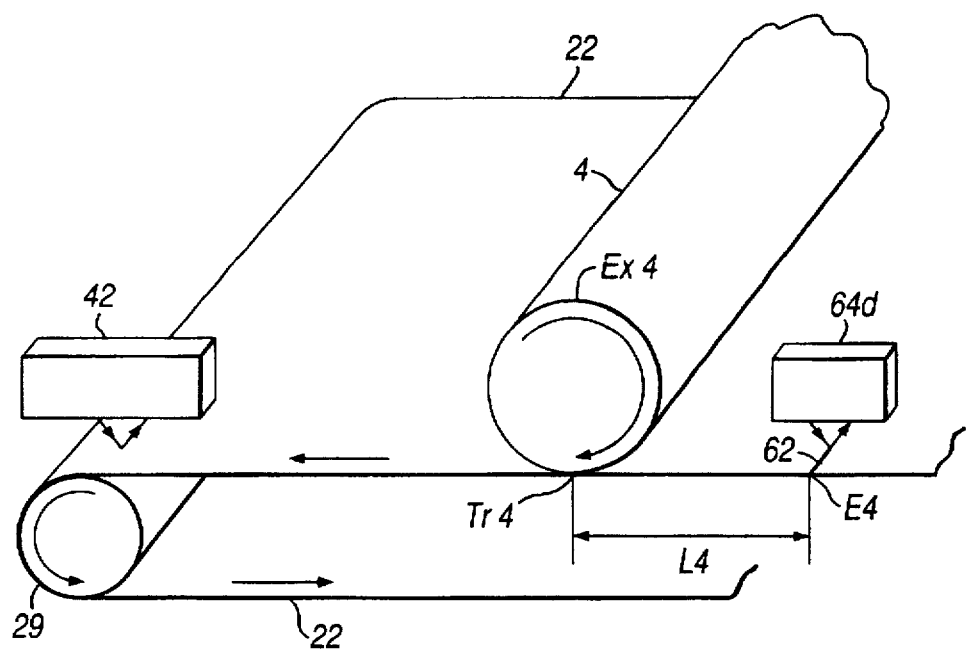
FIG. 22 is a perspective view showing the state of the fourth pattern marking start timing sensor arranged on the upper side of the transfer belt in the fifth embodiment of the present invention.
Figure 24:
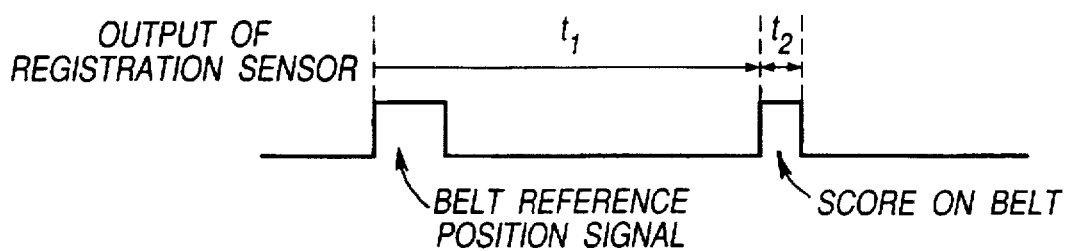
FIG. 24 is a timing chart for explaining the fifth embodiment of the present invention.

Next, a fifth embodiment of the present invention will be explained referring to FIG. 22. As shown in FIG. 22, a belt standard position mark 62 is put on the transfer belt 22 to show its standard position. The reflectance of this mark 62 is equal to or less than that of a toner. That is, this standard position mark 62 is detectable by the registration sensor 42.

Further, a reference numeral 64d denotes a fourth pattern marking start timing sensor for generating the test pattern exposure start timing on the photosensitive drum 4 and its basic structure is the same as the registration sensor 42. This sensor 64d detects the belt standard position mark 62 at a point E4 at a distance of L4 in the upper stream direction from a transfer point Tr4 on the photosensitive drum 4. Here, L4 shows a distance between Ex4 and Tr4.

In addition to the fourth pattern marking start timing sensor 64d, a first through a third pattern marking start timing sensors 64a–64c have been provided for generating the test pattern exposure start timing on the photosensitive drums 1–3 but they are omitted in FIG. 22.

Figure 23:
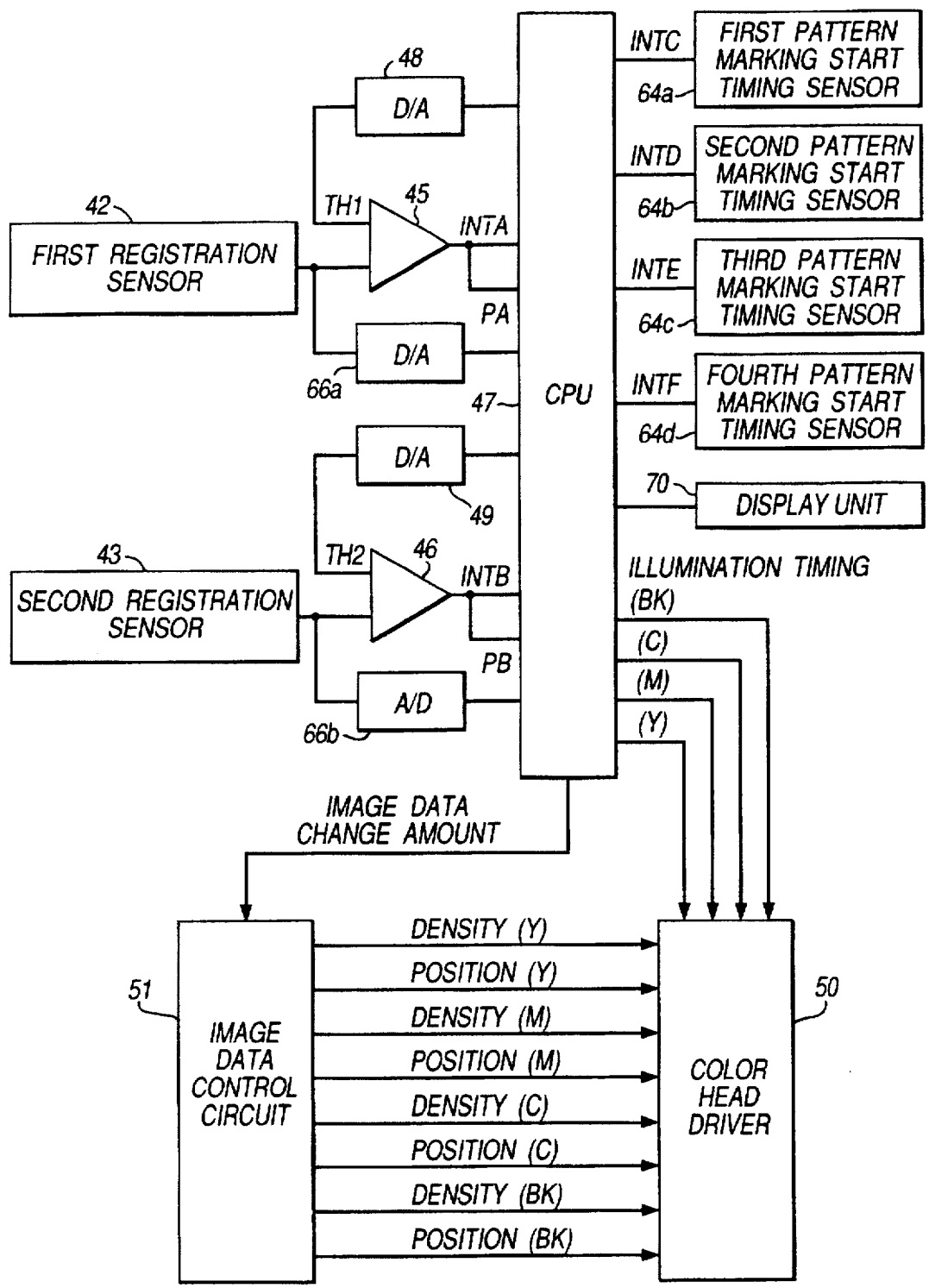
FIG. 23 is a block diagram showing the system configuration of an image forming apparatus involved in the fifth and the sixth embodiments of the present invention.

Referring to FIG. 23, the system configuration including the first through the fourth pattern marking start timing sensors 64a–64d will be explained. In FIG. 23, the same reference numerals are assigned to the same elements in FIG. 5 and the detailed explanations thereof will be omitted.

Figure 25:
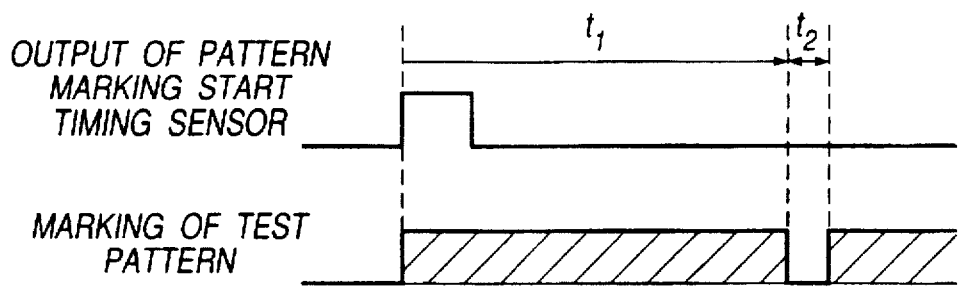
FIG. 25 is a timing chart for explaining the fifth embodiment of the present invention.

That is, in FIG. 23 the first through the fourth pattern marking start timing sensors 64a–64d output interrupt signals INTC–INTF to the CPU 47 when detecting the belt standard position mark 62. Further, thresholds TH1 and TH2 of comparators 45 and 46 are set separately through D/A converters 48 and 49. The outputs of the first and the second registration sensors 42 and 43 are converted into digital data through A/D converters 66a and 66b and output to the CPU 47. The CPU 47 controls color bar drivers 50 which control the first through the fourth imaging bars 9–12 so as to interrupt the exposure of a test pattern for a period of t2 seconds in addition to t1 seconds as shown in FIG. 25 after the output signal of the sensor 64d is output.

Now, when considering, for instance, a case where scores were produced on the transfer belt 22, the reflectance of these portions dropped and they were mis-detected by the sensor, the scores on the transfer belt 22 are detected by the registration sensor 42 at t1 seconds after the registration sensor 42 detected the belt standard position marks 62 (the sensor 42 is located at a position t1 seconds after the belt standard position mark signal is output). Then, the output of the registration sensor 42 for the scores is output for t2 seconds.

Now, when detecting misregistration, if a test pattern is exposed at a timing when the sensor 64d detects the belt standard position mark 62. As clear from the timing chart shown in FIG. 25, the CPU 47 controls to interrupt the exposure of a test pattern for a period of t2 seconds in addition to t1 seconds after the output signal of the sensor 64d is output and therefore, the test pattern is not marked on the scored position.

Thus, as the scored position on the transfer belt 22 is detected and a test pattern is not marked on the scored position, it becomes possible to get the stabilized output of the sensor.

Next, a sixth embodiment of the present invention will be explained referring to FIGS. 23, 26A through 27. That is, in this sixth embodiment, before the misregistration of color images detection routine, a threshold level is lowered from TH1 to TH1' by the process in the flowchart shown in FIG. 27 if the reflectance on the surface of the transfer belt 22 changed, for instance, dropped when measured by the registration sensor 42. That is, the threshold level of the comparator 45 is lowered as shown in FIG. 26C.

Figure 27:
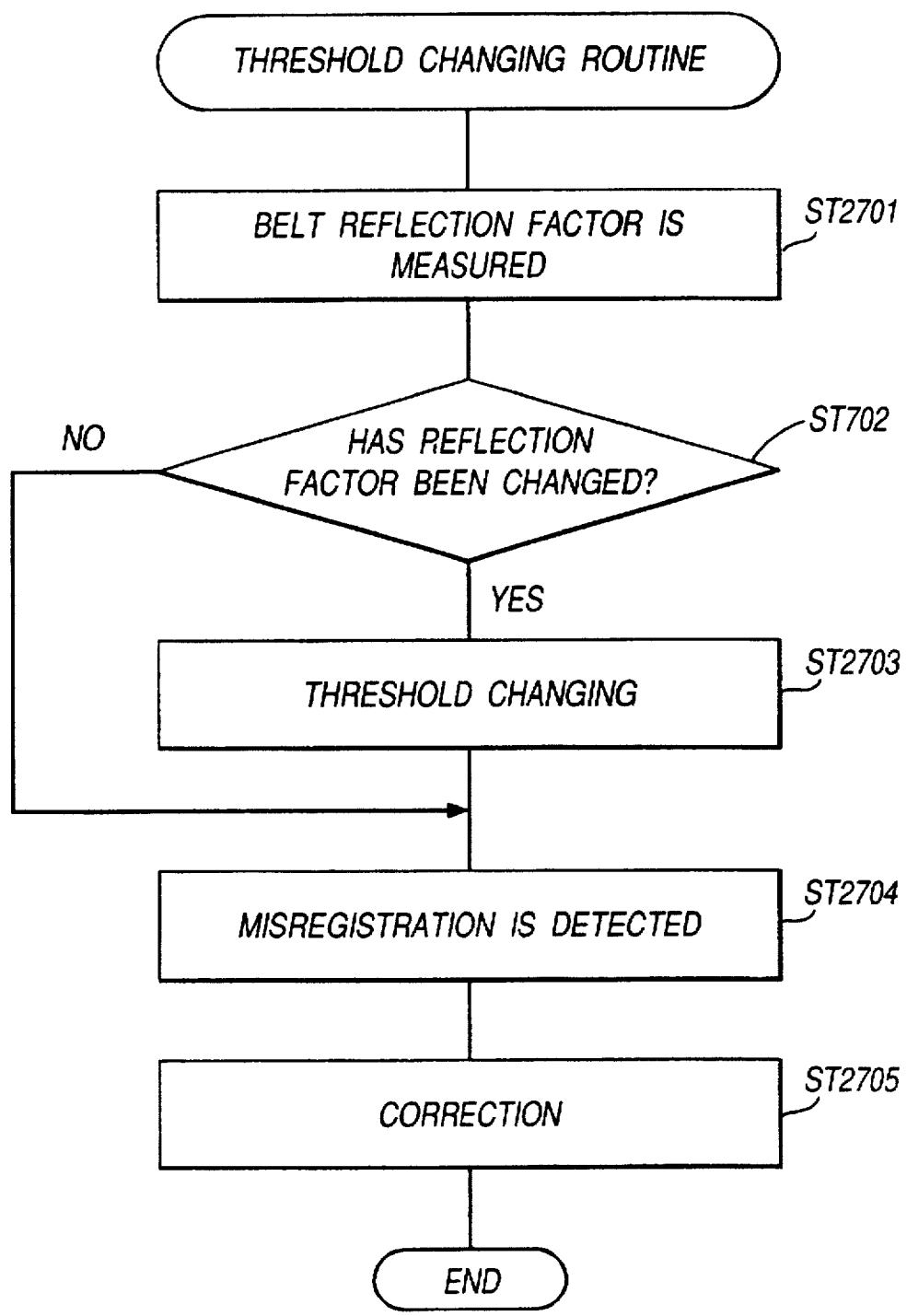
FIG. 27 is a flowchart for explaining a threshold changing routine in the sixth embodiment of the present invention.
Figure 30:
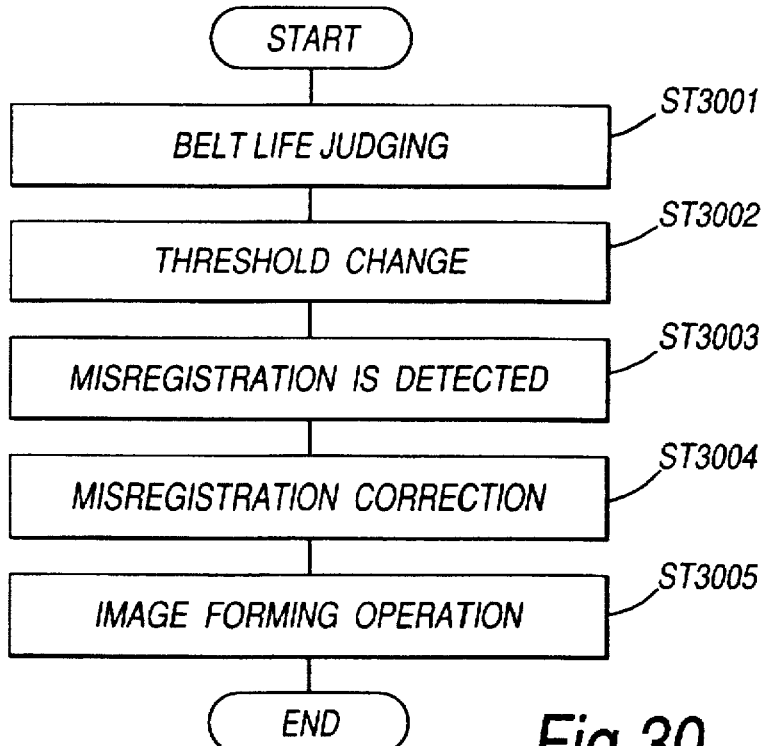
FIG. 30 is a flowchart for explaining an overall relationship of the flowcharts for explaining the routines in the present invention.

The flowchart shown in FIG. 27 will be explained in detail. The CPU 47 executes the threshold change routine before executing the misregistration of color images detecting routine (FIG. 30).

The registration sensors 42 and 43 detect the reflected light from the surface of the transfer belt 22 and output the sensor outputs. The sensor outputs are converted into digital signals by A/D converters 66a and 66b and output to the CPU 47. The CPU 47 reads the digital signals output from the A/D converters 66a and 66b. The outputs from the A/D converters 66a and 66b are A/D converted quantities of reflected light from the transfer belt measured by the sensors (ST2701).

When shipped from the factory, a quantity of reflected light of the belt was measured according to the same method as described above and its value has been stored as an initial value in the memory in the CPU 47. The CPU 47 compares the quantity of reflected light measured in Step ST2701 with this initial value. As the quantity of reflected light from the belt decreases if the reflectance of the belt is also decreased by contaminant or scores on the belt, a change in the reflectance of the belt can be seen if the change in reflected light quantity is monitored. That is, if an initial value is almost equal to a measured value, it is judged the reflectance remains unchanged and the normal misregistration of color images detection routine (ST2704) and the correction routine (ST2705) are executed. On the other hand, if a measured value has changed from an initial value, it is judged the reflectance of the belt changed and the threshold is changed. At this time, the CPU 47 stores the measured value in the memory as an initial value (ST2702 and ST2703).

If, for instance, a measured value is smaller than an initial value, the reflectance has decreased and the CPU 47 changes the threshold levels TH1 and TH2 to TH1' and TH2' (lower the threshold levels) by the D/A converters 48 and 49.

Thus, even if scores are produced on the transfer belt 22 in parallel with its running direction when it is cleaned by a belt cleaner, the reflectance of the transfer belt is reduced and the margin between the transfer belt 22 reflectance and the output of the registration sensor 42 in a test pattern becomes small, it is possible to discriminate a test pattern.

Figure 26A:
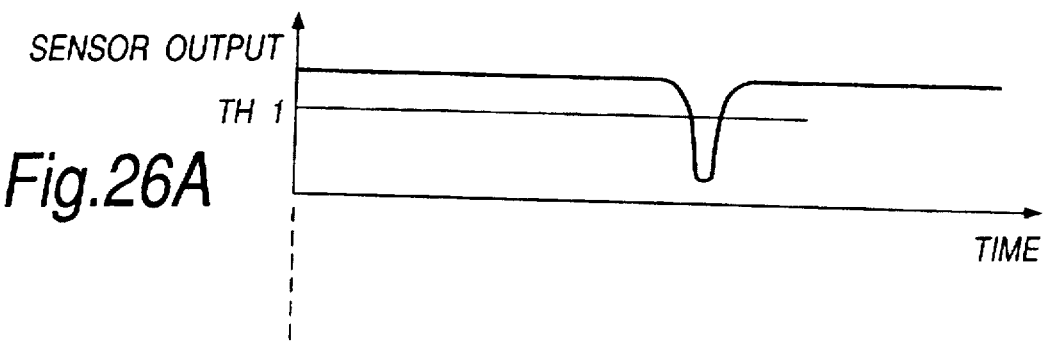
FIGS. 26A through 26D are graphs showing the state of the sensor outputs and binary outputs.
Figure 26B:
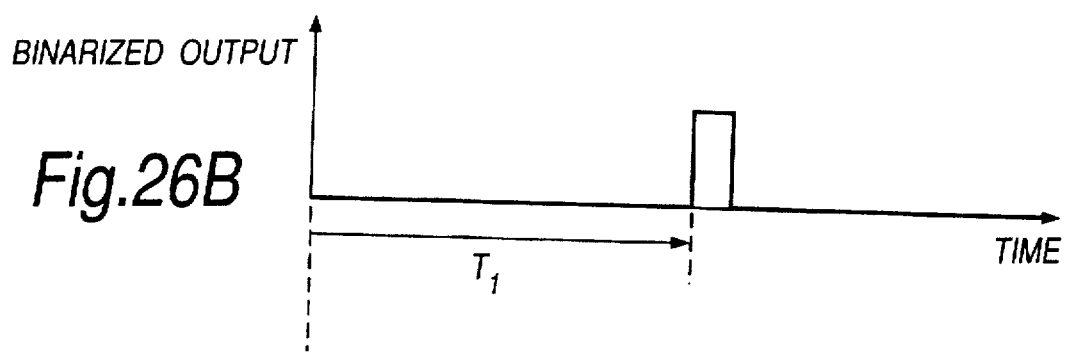
Figure 26C:
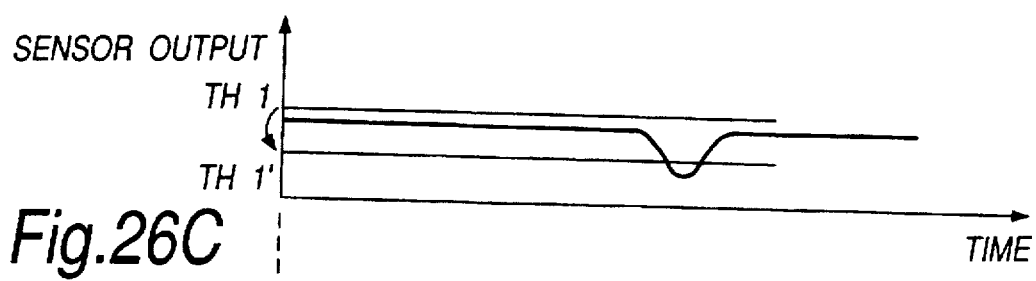
Figure 26D:
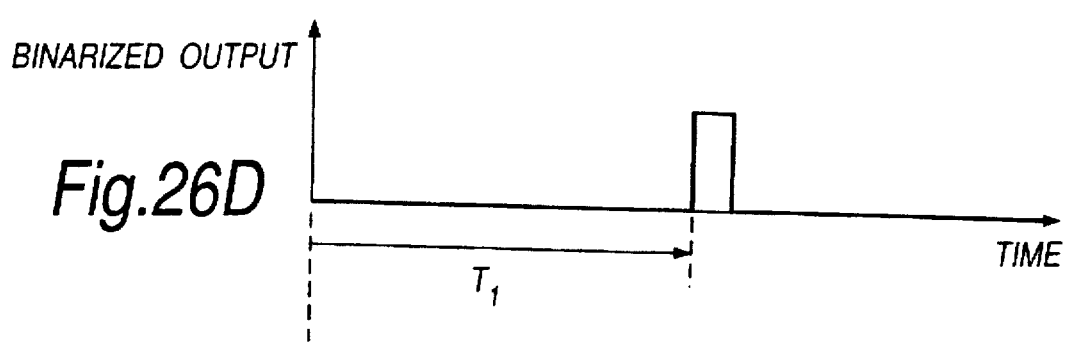

That is, if the reflectance of the transfer belt 22 is normal, a test pattern is detected by the registration sensor 42 as shown in FIG. 26A and the binarization process by the comparator 45 is normally carried out as shown in FIG. 26B.

On the other hand, even when the reflectance of the transfer belt 22 drops and the output of the registration sensor 42 becomes lower than the threshold level TH1 as shown in FIG. 26C, it is possible to get a normal binarized output from the comparator 45 by lowering the threshold level of the comparator 45 to TH1'.

Thus, it is possible to get the stabilized output of the registration sensor 42 without being affected by the influence of the scores on the transfer belt 22.

Figure 28:
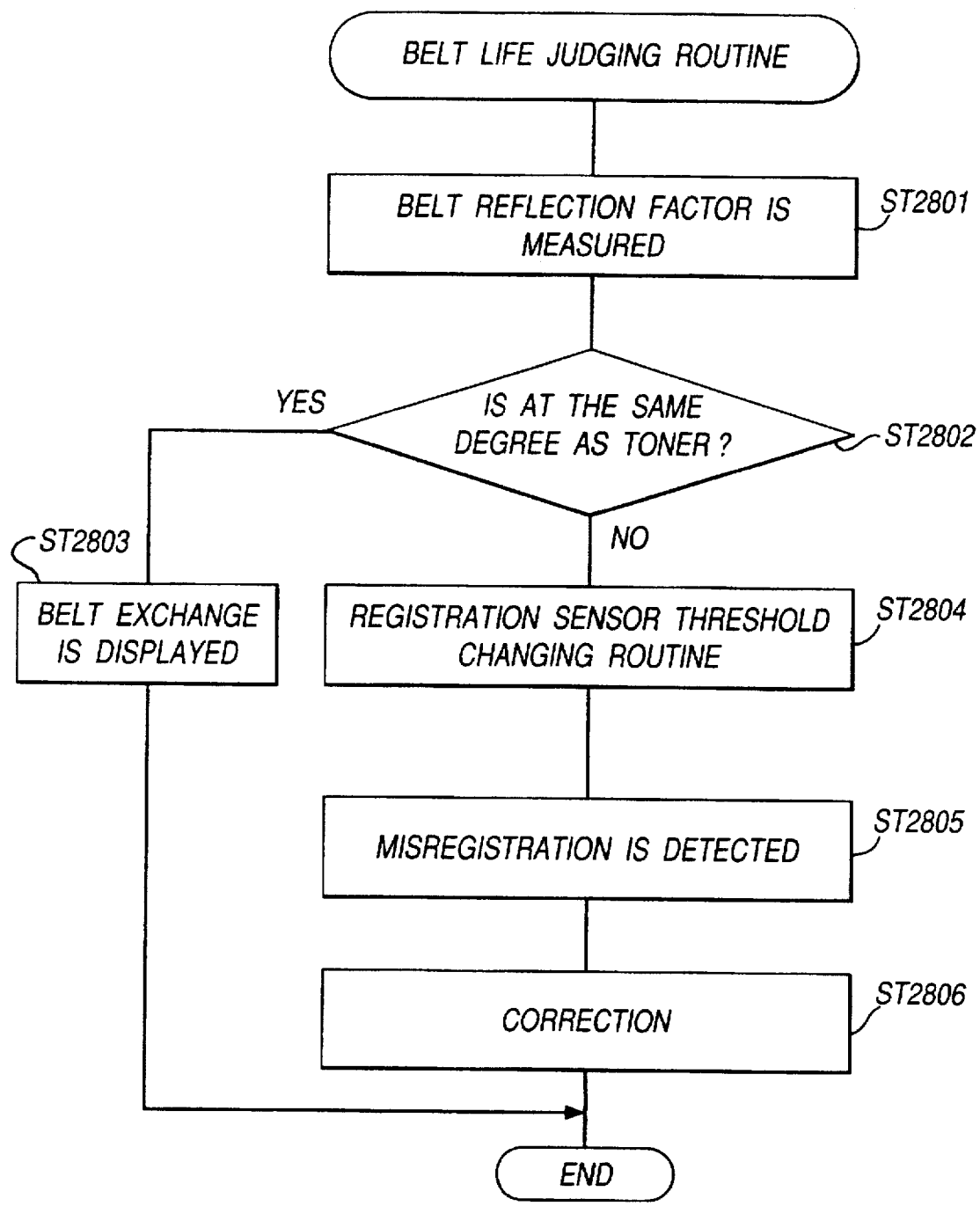
FIG. 28 is a flowchart for explaining a belt life judging routine in the seventh embodiment of the present invention.
Figure 29:
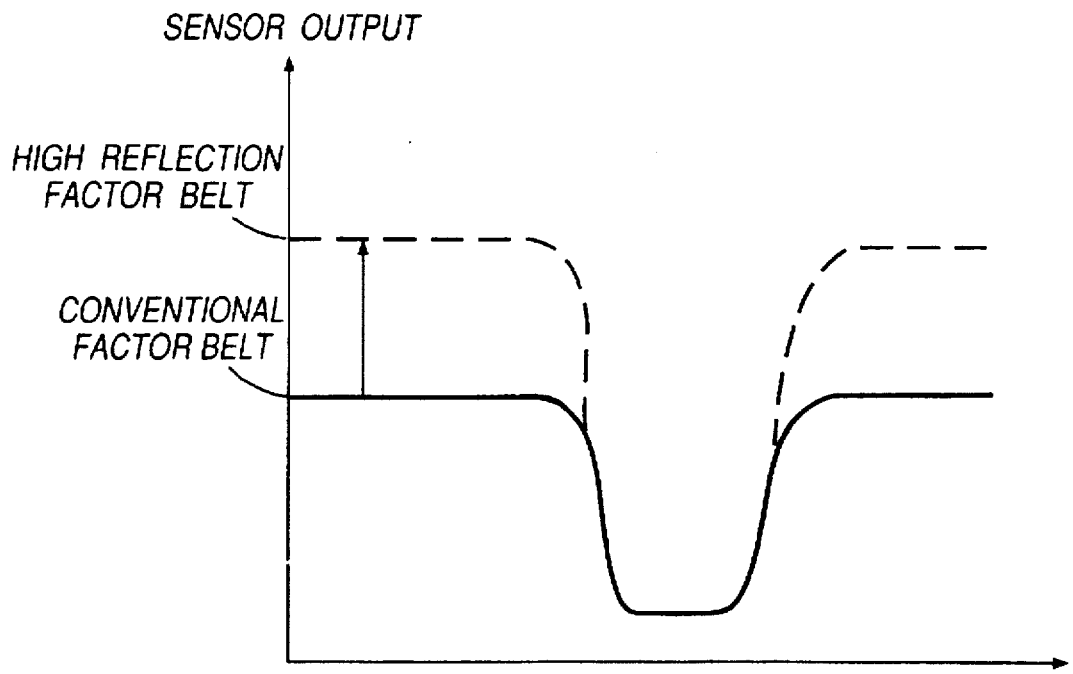
FIG. 29 is a graph for explaining the reflectance of the transfer belt.

Next, a seventh embodiment of the present invention will be explained referring to FIG. 28. As shown in the flowchart in FIG. 28, the reflectance of the transfer belt 22 is measured by the registration sensor 42 and when this reflectance becomes nearly equal to that of a toner, the belt exchanging period is indicated on the display unit 70 (FIG. 23).

That is, the CPU 47 measures the reflectance of the transfer belt like the threshold change routine. As this process is the same as Step ST3301, the explanation thereof will be omitted (ST2801).

When shipped from the factory, the quantity of reflected light of a test pattern formed by Y (Yellow), M (Magenta), C (Cyan) and Bk (Black) toners was measured and the measured value has been stored as an initial value in the memory in the CPU 47. The CPU 47 compares the quantity of reflected light measured in Step 2801 with the initial value (the test pattern, that is, toners). If the reflectance of the belt is reduced to nearly the same as that of toners due to contamination or scores produced on the belt, the belt and toners cannot be discriminated and the misregistration of color images becomes not detectable. That is, if there is a sufficient difference between an initial value and a measured value, the threshold change routine (ST2804), the misregistration detection routine (ST2805) and the correction routine (ST2805) are executed. On the other hand, if a measured value is almost the same as an initial value, the belt and toners cannot be discriminated and therefore, the CPU 47 displays that the belt should be exchanged on the display unit 70 (ST2803).

Thus, even when the surface of the transfer belt 22 was increasingly scored and deteriorated progressively, lowering the reflectance so as to make a difference with the reflectance of a test pattern (toners) almost zero and a threshold was changed, it is possible to detect a test pattern certainly.

In the first through the seventh embodiments described above, the transfer belt 22 uses a material having a high reflectance so as to make the reflectance of its surface large.

Thus, the use of a material having a high reflectance increases the reflectance of the surface of the transfer belt 22, which becomes the standard, makes a difference of the reflectance with toners large and it becomes possible to make the influence of scores and contamination on the surface of the transfer belt small when detecting a test pattern.

Further, a colorless, transparent layer of fluoric resin (for instance, PFA, PVdF, etc.) may be formed on the surface of the transfer belt 22 to improve the glossiness of the belt surface and increase the reflectance.

As described above, the output of the registration sensor 42 can be stabilized by increasing the reflectance of the transfer belt 22 itself.

Further, nickel, silver or other metals may be evaporated on the surface of the transfer belt 22.

In addition, the reflectance of the surface of the transfer belt 22 may be increased by polishing its surface.

In this case, the output from the registration sensor 42 also can be stabilized by increasing the reflectance of the transfer belt 22 itself.

Further, the routines explained in the flowcharts in the embodiments described above are executed at the positions in the flowchart shown in FIG. 30. That is, Step ST3001 is equivalent to "Belt Life Judging Routine" as explained with reference to FIG. 28 and Step ST3002 is equivalent to "Threshold Change Routine" as explained with reference to FIG. 27. Further, Steps ST3003 and ST3004 are equivalent to "Sub-Scanning Misregistration Detection/Correction Routine" in FIG. 7, "Main Scanning Misregistration Detection/Correction Routine" in FIG. 8, "Tilted Misregistration Detection/Correction Routine" in FIG. 9, "Measured Results Averaging Routine" in FIG. 20 and "Sub-Scanning Misregistration Detection/Averaging/Correction Routine" in FIG. 21, respectively. And the image forming operation (ST3005) is executed. That is, the belt life judgment and misregistration correction are all executed before the image forming operation (ST3005).

As described above in detail, the present invention is able to provide an image forming apparatus which is capable of forming color images without causing misregistration of color images, producing less change in sensor output due to scores and contamination of the transfer belt, and providing the stabilized the sensor output.

What is claimed is:

1. An image forming apparatus comprising:
   first image forming means for forming a first image on a first image carrier;
   second image forming means for forming a second image on a second image carrier;
   means for transferring the first image and the second image onto an image receiving medium conveyed by a medium support member, the first and second images to overlap each other on the image receiving medium;
   pattern forming means for forming a test pattern on one of the medium support member and the image receiving medium by the first and second image forming means;
   first detecting means for detecting the test pattern from a difference between a quantity of light reflected from the test pattern and a quantity of light reflected from the medium support member using a threshold value;
   means for correcting a misregistration relative to correct positions of the first and second images formed by the first and second image forming means based on a position of the test pattern detected by the first detecting means;
   second detecting means for detecting a variation of the quantity of light reflected from the medium support member caused by a variation of a light reflectance of the medium support member; and
   means for changing the threshold value in accordance with the variation of the quantity of light detected by the second detecting means such that the changed threshold value makes the first detecting means easily detect the test pattern irrespective of the variation of the light reflectance of the medium support member.

2. An image forming apparatus comprising:
   first image forming means for forming a first image on a first image carrier;
   second image forming means for forming a second image on a second image carrier;
   an endless belt placed over a pair of separated supporting rollers for conveying an image receiving medium;
   means for transferring the first image and the second image onto the image receiving medium conveyed by the endless belt, the first and second images to overlap each other on the image receiving medium;
   pattern forming means for forming a test pattern on one of the endless belt and the image receiving medium by the first and second image forming means;
   a vibration control roller arranged between the supporting rollers to suppress the vibration of the endless belt
   means, arranged at a position opposite to the vibration control roller, for detecting the test pattern from a difference between a reflectance of light from the test pattern and a reflectance of light from the endless belt using a threshold value;
   means for correcting a misregistration relative to correct positions of the first and second images formed by the first and second image forming means based on a position of the test pattern detected by the detecting means;
   means for measuring a reflectance of the endless belt from an output of the detecting means; and
   means for changing the threshold value in accordance with the reflectance measured by the measuring means such that the changed threshold value makes the detecting means easily detect the test pattern irrespective of decreasing of the reflectance of the endless belt.

3. An image forming apparatus comprising:
   first image forming means for forming a first color image on a first image carrier;
   second image forming means for forming a second color image on a second image carrier;
   an endless belt placed over a pair of separated supporting rollers for conveying an image receiving medium;
   means for transferring the first color image and the second color image onto the image receiving medium conveyed by the endless belt, the first and second color images to overlap each other on the image receiving medium;
   pattern forming means for forming a test pattern on one of the endless belt and the image receiving medium by the first and second image forming means;
   a vibration control roller arranged between the supporting rollers to suppress the vibration of the endless belt;
   means, arranged at a position opposite to the vibration control roller, for detecting the test pattern, the detecting means having a light protecting portion and a light receiving portion which are arranged in parallel with the running direction of the endless belt;
   means for computing misregistration of color images transferred onto one of the endless belt and the image receiving medium based on the results of detection by the detecting means; and
   means for correcting the misregistration of color images based on the result of computation by the computing means.

4. An image forming apparatus comprising:
   first image forming means for forming a first color image on a first image carrier;
   second image forming means for forming a second color image on a second image carrier;
   an endless belt placed over a pair of separated supporting rollers for conveying an image receiving medium;
   means for transferring the first color image and the second color image onto the image receiving medium conveyed by the endless belt, the first and second color images to overlap each other on the image receiving medium;
   pattern forming means for forming a test pattern on one of the endless belt and the image receiving medium by the first and second image forming means;
   a vibration control roller arranged between the supporting rollers to suppress the vibration of the endless belt;

means, having a light protecting portion and a light receiving portion, for detecting the test pattern, the detecting means being arranged at a position opposite to the vibration control roller;

means for computing misregistration of color images transferred onto one of the endless belt and the image receiving medium based on the results of detection by the detecting means; and means for correcting the misregistration of color images based on the result of computation by the computing means.

5. An image forming apparatus comprising:

first image forming means for forming a first color image on a first image carrier;

second image forming means for forming a second color image on a second image carrier;

an endless belt placed over a pair of separated supporting rollers for conveying an image receiving medium;

means for transferring the first color image and the second color image onto the image receiving medium conveyed by the endless belt, the first and second color images to overlap each other on the image receiving medium;

pattern forming means for forming a test pattern on one of the endless belt and the image receiving medium by the first and second image forming means;

a vibration control roller arranged between the supporting rollers to suppress the vibration of the endless belt;

means, arranged at the position opposite to the vibration control roller, for detecting the test pattern and outputting detection results;

means for averaging the detection results and for computing misregistration of color images transferred onto one of the endless belt and the image receiving medium based on averaged results; and means for correcting the misregistration of color images based on the results of computation by the computing means.

6. An image forming apparatus comprising:

first image forming means for forming a first color image on a first image carrier;

second image forming means for forming a second color image on a second image carrier;

means for transferring the first color image and the second color image onto an image receiving medium conveyed by a medium support member, the first and second color images to overlap each other on the image receiving medium;

pattern forming means for forming a test pattern on one of the medium support member and the image receiving medium by the first and second image forming means;

first detection means for detecting the test pattern;

means for computing misregistration of color images transferred onto one of the medium support member and the image receiving medium based on the results of detection by the first detection means;

means for correcting the misregistration of color images based on the result of computation by the computing means;

second detection means for detecting a forming start timing of the test pattern; and means for detecting scores and contamination of the medium support member by the second detection means and for interrupting the formation of the test pattern by the pattern forming means so as not to form the test pattern on the scored and contaminated portions.

7. The apparatus according to claim 6 further comprising a pair of separated supporting rollers, and wherein the medium support member includes an endless belt which is placed over the pair of the supporting rollers and the first detection means is arranged at the position opposite to at least one of the supporting rollers.

8. The apparatus according to claim 6 further comprising a pair of separated supporting rollers and a vibration control roller, wherein the medium support member includes an endless belt which is put over the pair of the supporting rollers, the vibration control roller arranged between the pair of the supporting rollers to suppress the vibration of the endless belt and wherein the first detection means is arranged at the position opposite to the vibration control roller.

9. An image forming apparatus comprising:

first image forming means for forming a first color image on a first image carrier;

second image forming means for forming a second color image on a second image carrier;

means for transferring the first color image, and the second color image onto an image receiving medium conveyed by a medium support member, the first and second color images to overlap each other on the image receiving medium;

pattern forming means for forming a test pattern on one of the medium support member and the image receiving medium by the first and second image forming means;

means for detecting the test pattern;

means for computing misregistration of color images transferred onto one of the medium support member and the image receiving medium based on the results of detection by the detecting means;

means for correcting the misregistration of color images based on the result of computation by the computing means;

means for measuring a reflectance of the medium support member from an output of the detecting means; and means for indicating that the medium support member should be exchanged based on the reflectance of the medium support member measured by the measuring means.

10. The apparatus according to claim 9 further comprising a pair of separated supporting rollers, and wherein the medium support member includes an endless belt which is placed over the pair of the supporting rollers and the detecting means is arranged at the position opposite to at least one of the supporting rollers.

11. The apparatus according to claim 9 further comprising a pair of separated supporting rollers and a vibration control roller, wherein the medium support member includes an endless belt which is put over the pair of the supporting rollers, the vibration control roller arranged between the pair of the supporting rollers to suppress the vibration of the endless belt and wherein the detecting means is arranged at the position opposite to the vibration control roller.

* * * * *